(12) United States Patent
Wang et al.

(10) Patent No.: US 11,756,205 B2
(45) Date of Patent: Sep. 12, 2023

(54) METHODS, DEVICES, APPARATUSES AND STORAGE MEDIA OF DETECTING CORRELATED OBJECTS INVOLVED IN IMAGES

(71) Applicant: SENSETIME INTERNATIONAL PTE. LTD., Singapore (SG)

(72) Inventors: Bairun Wang, Singapore (SG); Xuesen Zhang, Singapore (SG); Chunya Liu, Singapore (SG); Jinghuan Chen, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 260 days.

(21) Appl. No.: 17/342,917

(22) Filed: Jun. 9, 2021

(65) Prior Publication Data
US 2022/0207741 A1 Jun. 30, 2022

Related U.S. Application Data

(63) Continuation of application No. PCT/IB2021/053563, filed on Apr. 29, 2021.

(30) Foreign Application Priority Data

Dec. 31, 2020 (SG) .............................. 10202013267T

(51) Int. Cl.
*G06T 7/11* (2017.01)
*G06V 40/10* (2022.01)
(Continued)

(52) U.S. Cl.
CPC .............. *G06T 7/11* (2017.01); *G06F 18/214* (2023.01); *G06N 3/08* (2013.01); *G06V 40/103* (2022.01); *G06V 40/107* (2022.01); *G06V 40/166* (2022.01)

(58) Field of Classification Search
CPC ............ G06T 7/11; G06T 2207/20081; G06T 2207/20084; G06T 2207/30196;
(Continued)

(56) References Cited

U.S. PATENT DOCUMENTS 10,037,458 B1 * 7/2018 Mahmoud ............ G06V 40/113
10,824,908 B1 * 11/2020 Park ....................... G16H 30/40
(Continued)

FOREIGN PATENT DOCUMENTS

| CN | 104123532 | 10/2014 |
|----|-----------|---------|
| CN | 104123532 | 5/2017 |

(Continued)

OTHER PUBLICATIONS

PCT International Search Report in International Appln. No. PCT/IB2021/053563, dated Sep. 1, 2021, 4 pages.
(Continued)

*Primary Examiner* — Mia M Thomas
(74) *Attorney, Agent, or Firm* — Fish & Richardson P.C.

(57) ABSTRACT

Methods, systems, and apparatus for detecting correlated objects involved in images are provided. In one aspect, a method includes: detecting a face object, a preset body part object, and a hand object involved in an image, performing a respective correlation prediction on every two of the face object, the preset body part object, and the hand object to obtain first, second, and third correlation prediction results, segmenting the image to determine at least one body object involved in the image to determine a first body object to which the face object belongs and a second body object to which the preset body part object belongs, adjusting the first correlation prediction result based on the first body object and the second body object, and determining correlated
(Continued)

objects involved in the image according to the adjusted first correlation prediction result and the second and third correlation prediction results.

20 Claims, 6 Drawing Sheets

(51) Int. Cl.
*G06V 40/16* (2022.01)
*G06F 18/214* (2023.01)
*G06N 3/08* (2023.01)

(58) Field of Classification Search
CPC ..... G06T 2210/12; G06F 18/214; G06N 3/08; G06N 3/045; G06N 3/084; G06V 40/103; G06V 40/107; G06V 40/166; G06V 10/82; G06V 40/161; G06V 20/40; G06V 10/443; G06V 10/751; G06V 40/11; A63F 3/00
See application file for complete search history.

(56) References Cited

U.S. PATENT DOCUMENTS

| | | | | |
|---|---|---|---|---|
| 2013/0051662 | A1* | 2/2013 | Shiozaki | G06V 40/161 |
| | | | | 382/159 |
| 2018/0120950 | A1* | 5/2018 | Karmon | G06V 40/28 |
| 2020/0296132 | A1* | 9/2020 | Lv | G06V 40/40 |
| 2021/0158021 | A1* | 5/2021 | Wu | G06V 40/165 |
| 2022/0171962 | A1* | 6/2022 | Zu | G06V 40/113 |
| 2022/0301219 | A1* | 9/2022 | Liu | G06V 10/774 |

FOREIGN PATENT DOCUMENTS

| | | |
|---|---|---|
| CN | 110636315 | 12/2019 |
| KR | 20200133555 | 11/2020 |
| WO | 2019222383 | 11/2019 |
| WO | 2020153971 | 7/2020 |

OTHER PUBLICATIONS

PCT International Written Opinion in International Appln. No. PCT/IB2021/053563, dated Sep. 1, 2021, 5 pages.
SG Office Action issued in Singapore Appln. No. 10202013267T, dated Sep. 21, 2021, 10 pages.
AU Office Action issued in Australian Appln. No. 2021203821, dated Apr. 20, 2022, 5 pages.
Li et al., "Self-correction for human parsing." IEEE Transactions on Pattern Analysis and Machine Intelligence, Dec. 2020, 10 pages.
Papandreou et al., "Towards accurate multi-person pose estimation in the wild." Proceedings of the IEEE conference on computer vision and pattern recognition, Apr. 2017, 9 pages.
Sun et al., "Articulated part-based model for joint object detection and pose estimation." 2011 International Conference on Computer Vision. IEEE, Nov. 2011, 8 pages.
Office Action in Korean Appln. No. 10-2021-7019260, dated Dec. 10, 2022, 13 pages (with English translation).

* cited by examiner

METHODS, DEVICES, APPARATUSES AND STORAGE MEDIA OF DETECTING CORRELATED OBJECTS INVOLVED IN IMAGES

CROSS-REFERENCE TO RELATED APPLICATION

The present application is a continuation of International Application No. PCT/IB2021/053563 filed on Apr. 29, 2021, which claims priority to Singapore Patent Application No. 10202013267T, filed on Dec. 31, 2020, all of which are incorporated herein by reference in their entirety.

TECHNICAL FIELD

Embodiments of the present disclosure relate to methods, devices, apparatuses, and storage media of detecting correlated objects involved in an image.

BACKGROUND

Intelligent video analysis technology can help people to learn status of objects and relationships between objects in physical space. In an application scenario of intelligent video analysis, it is required to identify a person's identity corresponding to a body part present involved in the video.

Specifically, respective first body parts that are easy to be identified may be firstly associated with respective personnel identities in a none-one correspondence. After the correspondence is created and maintained, for a second body part present involved in a video, a first body part which is correlated with the second body part (that is, the first body part and the second body part are correlated with each other and they are named as correlated objects hereinafter) may be determined, and a personnel identity corresponding to the second body part may be identified based on the first body part. Here, the term "correlated objects" may refer to the first body part and the second body part that belong to one person. In a case that two body parts are correlated objects, it may be regarded that the two body parts belong to the same person.

By correlating body parts involved in the image, it can further help to analyze individual behavior and status for a plurality of persons in a multi-person scene, as well as the relationships between the plurality of persons. For example, a plurality of face objects and a plurality of hand objects may be detected in an image, and a face object and a hand object that belong to a same person may be determined. After determining the face object and the hand that belong to the same person, a personal identity that performs a preset action or touches a preset region with the hand object may be determined according to the face object that is correlated with the hand object.

SUMMARY

In view of this, the present discloses a method of detecting correlated objects involved in an image, including: detecting a face object, a preset body part object, and a hand object involved in the image, wherein the preset body part object indicates a preset body part of a body connection part between a face and a hand; performing correlation prediction on every two of the face object, the preset body part object, and the hand object to acquire a first correlation prediction result between the face object and the preset body part object, a second correlation prediction result between the preset body part object and the hand object, and a third correlation prediction result between the face object and the hand object; segmenting the image to determine at least one body object involved in the image; determining, based on a respective region corresponding to the at least one body object, a first body object to which the face object belongs and a second body object to which the preset body part object belongs; adjusting the first correlation prediction result based on the first body object and the second body object; and determining correlated objects involved in the image according to the adjusted first correlation prediction result, the second correlation prediction result and the third correlation prediction result.

In some embodiments of the present disclosure, detecting the face object, the preset body part object and the hand object involved in the image, includes: detecting a first bounding box for the face object and a second bounding box for the preset body part objects involved in the image; and determining, based on the respective region corresponding to the at least one body object, the first body object to which the face object belongs and the second body object to which the preset body part object belongs comprises: determining a first overlapping area between a region corresponding to the face object and the respective region corresponding to the at least one body object according to the first bounding box for the face object; determining a second overlapping area between a region corresponding to the preset body part object and the respective region corresponding to the at least one body object according to the second bounding box for the preset body part object; and determining the first body object to which the face object belongs and the second object body to which the preset body part object belongs according to the first overlapping area and the second overlapping area.

In some embodiments of the present disclosure, determining the first body object to which the face object belongs and the second body object to which the preset body part object belongs according to the first overlapping area and the second overlapping areas includes: selecting, from the respective region corresponding to the at least one body object, a first target region, where the first overlapping area between the region corresponding to the face object and the respective region corresponding to the at least one body object is greatest among overlapping areas between the region corresponding to face object and candidate regions from the particular region; selecting, from the respective region corresponding to the at least one body object, a second target region, where the second overlapping area between the region corresponding to the preset body object and the respective region corresponding to the at least one body object is greatest among overlapping areas between the region corresponding to preset body part object and candidate regions from the particular region; and determining a body object corresponding to the first target region as the first body object to which the face object belongs; and determining a body object corresponding to the second target region as the second body object to which the preset body part object belongs.

In some embodiments of the present disclosure, adjusting the first correlation prediction result based on the first body object and the second body object includes: acquiring a matching result by comparing the first body object with the second body object; and adjusting the first correlation prediction result based on the matching result.

In some embodiments of the present disclosure, adjusting the first correlation prediction result based on the matching result includes: in response to determining the first body object matches the second body object, increasing a correlation prediction score in the first correlation prediction result; and/or, in response to determining that the first body object does not match the second body object, decreasing the correlation prediction score in the first correlation prediction result.

In some embodiments of the present disclosure, the method further includes: combining the face object, the preset body part object, and the hand object to generate at least one triad, each of which comprises one face object, one body part object, and one hand object; performing a correlation prediction one every two of the face object, the preset body part object, and the hand object includes: performing a correlation prediction on every two objects of each triad; and determining the correlated objects involved in the image according to the adjusted first correlation prediction result, the second correlation prediction result, and the third correlation prediction result includes: determining a fourth correlation prediction result of each triad according to the adjusted first correlation prediction result, the second correlation prediction result, and the third correlation prediction result; and determining correlated objects involved in the image based on the fourth correlation prediction result of each triad.

In some embodiments of the present disclosure, determining the correlated objects involved in the image based on the fourth correlation prediction result of each triad includes: selecting a current triad from respective triads according to an order of correlation prediction scores in the fourth correlation prediction results of the respective triads from high to low; and for the current triad: determining, based on the determined correlated objects, whether a number of correlated hand objects that are correlated with the face object of the current triad reaches a first preset threshold and whether a number of correlated face objects that are correlated with the hand object of the current triad reaches a second present threshold; determining the face object and the hand object of the current triad as the correlated objects involved in the image in response to determining that the number of the correlated hand objects does not reach the first preset threshold and the number of the correlated face objects does not reach the second preset threshold.

In some embodiments of the present disclosure, the preset body part object comprises at least one of a shoulder object or an elbow object.

In some embodiments of the present disclosure, the method further includes: outputting a detection result of the correlated objects involved in the image.

In some embodiments of the present disclosure, detecting the face object, the preset body part object, and the hand object involved in the image includes: detecting the face object, the preset body part object and the hand object involved in the image with an object detecting model built based on a neural network; performing a correlation prediction on every two of the face object, the preset body part object, and the hand object includes: performing a correlation prediction on every two of the face object, the preset body part object, and the hand object with a correlation predicting model built based on a neural network; and; segmenting the image to determine the at least one body object involved in the image includes: segmenting the image to determine the at least one body object involved in the image with an instance segmenting model built based on a neural network.

In some embodiments of the present disclosure, the method further includes: training the object detecting model with a first training sample set, wherein the first training sample set includes image training samples labeled with first label information, and the first label information comprises a bounding box for the face object, a bounding box for the preset body part object and a bounding box for the hand object; training the instance segmenting model with a second training sample set, wherein the second training sample set comprises image training samples labeled with second label information and the second label information includes a bounding box for body object; jointly training the object detecting model, the instance segmenting model, and the correlation predicting model with a third training sample set, wherein the third training sample set comprises image training samples labeled with third label information and the third label information includes a bounding box for face object, a bounding box for preset body part object, a bounding box for hand object, a bounding box for body object, correlation label information between the face object and the preset body part object, correlation label information between the preset body part object and the hand object, and correlation label information between the hand object and the face object.

The present disclosure further provides a device for detecting correlated objects involved in an image, including: an object detecting module, configured to detect a face object, a preset body part object and a hand object involved in the image, wherein the preset body part object indicates a preset body part of a body connection part between a face and a hand; a correlation predicting module, configured to perform a correlation prediction on every two of the face object, the preset body part object, and the hand object, to acquire a first correlation prediction result between the face object and the preset body part object, a second correlation prediction result between the preset body part object and the hand object, and a third correlation prediction result between the face object and the hand object; a belonging relationship determining module, configured to segment the image to determine at least one body object, and determine, based on a respective region corresponding to the at least one body object, a first body object to which the face object belongs and a second body object to which the preset body part object belongs; and a correlated-objects determining module, configured to adjust the first correlation prediction result based on both the first body object and the second body object, and determine correlated objects involved in the image according to the adjusted first correlation prediction result, the second correlation prediction result and the third correlation prediction result.

In some embodiments of the present disclosure, the object detecting module is configured to: detect a first bounding box for the face object and a second bounding box for the preset body part object involved in the image; the belonging relationship determining module includes: an overlapping area determining module, configured to determining a first overlapping area between a region corresponding to the face object and the respective region of the at least one body object, and a second overlapping area between a region corresponding to the preset body part object and the respective region of the at least one body object; a belonging relationship determining sub-module, configured to determine a first body object to which the face object belongs and the second body object that the preset body part object belongs according to the first overlapping area and the second overlapping area.

In some embodiments of the present disclosure, the belonging relationship determining sub-module is configured to: select, from the respective region corresponding to the at least one body object, a first target region, where the first overlapping area between the region corresponding to the face object and the first target region is greatest among overlapping areas between the region corresponding to face object and candidate regions from the particular region; select, from the respective region corresponding to the at least one body object, a second target region, where the second overlapping area between the region corresponding to the preset body part object and the second target region is greatest among overlapping areas between the region corresponding to preset body part object and candidate regions from the particular region; and determine a body object corresponding to the first target region as the first body object to which the face object belongs and a body object corresponding to the second target region as the second body object to which the preset body part object belongs.

In some embodiments of the present disclosure, the correlated-objects determining module is configured to: acquire a matching result by comparing the first body object with the second body object; and adjust the first correlation prediction result based on the matching result.

In some embodiments of the present disclosure, the correlated-objects determining module is configured to: in response to determining the first body object matches the second body object, increasing a correlation prediction score in the first correlation prediction result; and/or, in response to determining the first body object does not match the second body object, decreasing the correlation prediction score in the first correlation prediction score.

In some embodiments of the present disclosure, the apparatus further includes: a combining module, configured to combine the face object, the preset body part object, and the hand object to generate at least one triad, each of which comprises one face object, one body part object, and one hand object; the correlation predicting module is configured to: perform a correlation prediction on every two objects of each triad; the correlated-objects determining module includes: a triad correlation relationship predicting module, configured to determine a fourth correlation prediction result of each triad according to the adjusted first correlation prediction result, the second correlation prediction result, and the third correlation prediction result; a correlated-objects determining sub-module, configured to determine correlated objects involved in the image based on the fourth correlation prediction result of each triad.

In some embodiments of the present disclosure, the correlated-objects determining sub-module is configured to: select a current triad from respective triads according to an order of correlation prediction scores in the fourth correlation prediction results of the respective triads from high to low: and for the current triad: determining, based on the determined correlated objects, whether a number of correlated hand objects that are correlated with the face object of the current triad reaches a first preset threshold and whether a number of correlated face objects that are correlated with the hand objects of the current triad reaches a second present threshold; determining the face object and the hand object of the current triad as the correlated objects involved in the image in response to determining the number of the correlated hand objects does not reach the first preset threshold and the number of the correlated face objects does not reach the second preset threshold.

In some embodiments of the present disclosure, the preset body part object includes at least one of a shoulder object or an elbow object.

In some embodiments of the present disclosure, the device further includes: an outputting module, configured to output a detection result of the correlated object involved in the image.

In some embodiments of the present disclosure, the object detecting module is configured to: detect the face object, the preset body part object and the hand object involved in the image with an object detecting model built based on a neural network; the correlation predicting module is configured to: perform a correlation prediction on every two of the face object, the preset body part object, and the hand object with a correlation predicting model built based on a neural network; the belonging relationship determining module is configured to: segment the image to determine at least one body object involved in the image with an instance segmenting model built based on a neural network.

In some embodiments of the present disclosure, the device further includes: a first training module, configured to train the object detecting model with a first training sample set, wherein the first training sample set includes image training samples labeled with first label information and the first label information includes a bounding box for the face object, a bounding box for the preset body part object and a bounding box for the hand object; a second training module, configured to train the instance segmenting model with a second training sample set, wherein the second training sample set comprises image training samples labeled with second label information, and the second label information includes a bounding box for the at least one body object; a joint training module, configured to jointly train the object detecting model, the instance segmenting model, and the correlation prediction model with a third training sample set, wherein the third training sample set comprises image training samples labeled with third label information and the third label information includes a bounding box for the face object, a bounding box for the preset body part object, a bounding box for the hand object, a bounding box for the at least one body object, correlation label information between the face object and the preset body part object, correlation label information between the preset body part object and the hand object, and correlation label information between the hand object and the face object.

Embodiments of the present disclosure further provide an electronic apparatus, the electronic apparatus includes: a processor; and memory, configured to store executable instructions by the processor; wherein the processor is configured to call executable instructions stored in the memory to implement operations of the method of detecting correlated objects involved in an image according to any embodiment as described above.

Embodiments of the present disclosure further provide a computer-readable storage medium storing a computer program, wherein the computer program is configured to execute the method of detecting correlated objects involved in an image according to any embodiment as described above.

Embodiments of the present disclosure further provide a computer program, including computer-readable codes which, when executed in an electronic device, cause a processor in the electronic device to perform the method of detecting correlated objects involved in an image according to any embodiment as described above.

In the above solutions according to the method, on one hand, a preset body part closely related to the hand object is taken as an intermediary, a first correlation prediction result between the face object and the preset body part object, a second correlation prediction result between the preset body part object and the hand object as well as a third correlation prediction result between the face object and the hand object are determined respectively, and then, correlated objects involved in an image may be determined according to the first correlation prediction result, the second correlation prediction result and the third correlation prediction result. In this way, less interference is introduced in the process of determining correlated objects, and thus improving the accuracy of result of determining the face object and the hand object that are correlated with each other.

On the other hand, the first correlation prediction result between the face object and the preset body part object is optimized by segmenting the body objects involved in the image such that the correlation prediction result between the face object and the preset body part object can be more accurate, and thereby improving the accuracy of detecting correlated objects.

It should be understood that the above general description and the following detailed description are only exemplary and explanatory, and cannot be construed as a limit to the present disclosure.

BRIEF DESCRIPTION OF THE DRAWINGS

In order to more clearly describe the technical solutions according to one or more embodiments of the present disclosure or related technologies, the following will briefly describe the accompanying figures that need to be used in the description of the embodiments or related technologies. Obviously, the figures described hereinafter just illustrate some implementations recorded in one or more embodiments of the present disclosure, and one of ordinary skill in the art can obtain other figures without creative works based on these figures.

DETAILED DESCRIPTION OF THE EMBODIMENTS

The exemplary embodiments will be described in detail below, and examples thereof are illustrated in the accompanying drawings. In a case that the following description refers to the drawings, the same numbers in different drawings designate the same or similar elements unless otherwise indicated. The implementations described in the following exemplary embodiments do not represent all the implementations consistent with the present disclosure. On the contrary, they are only examples of devices and methods consistent with some aspects of the disclosure as set forth in the appended claims.

The terms used herein are only for the purpose of describing the embodiments of the present disclosure, and are not intended to limit the present disclosure. The singular forms of "a", and "an" used in the present disclosure and the appended claims are also intended to include plural forms, unless it is clearly defined to have other meanings in the context. It should also be understood that the term "and/or" used herein refers to and includes any or all possible combinations of one or more associated listed items. It should also be understood that the word "if" used herein, depending on the context, can be interpreted as "upon" or "in a case that" or "in response to determination".

This present disclosure proposes a method of detecting correlated objects involved in an image (hereinafter referred to as method of detecting correlated objects). On the one hand, in the method, taking a preset body part closely correlated to a hand object as an intermediary, a first correlation prediction result between a face object and the preset body part, a second correlation prediction result between the preset body part and the hand object, and a third correlation prediction result between the face object and the hand object are determined respectively. Then, correlated objects involved in an image are determined according to the first correlation prediction result, the second correlation prediction result and the third correlation prediction result. Thus, less interference are introduced in the process of determining correlated objects, thereby improving the accuracy of determining the face object and the hand object that are correlated with each other.

On the other hand, in the method, the first correlation prediction result between the face object and the preset body part is optimized with the result of segmenting an image to determine body objects, so that the correlation prediction result of the face object and the preset body part object is more accurate, thereby improving the accuracy of the result of determining the correlated objects.

Figure 1:
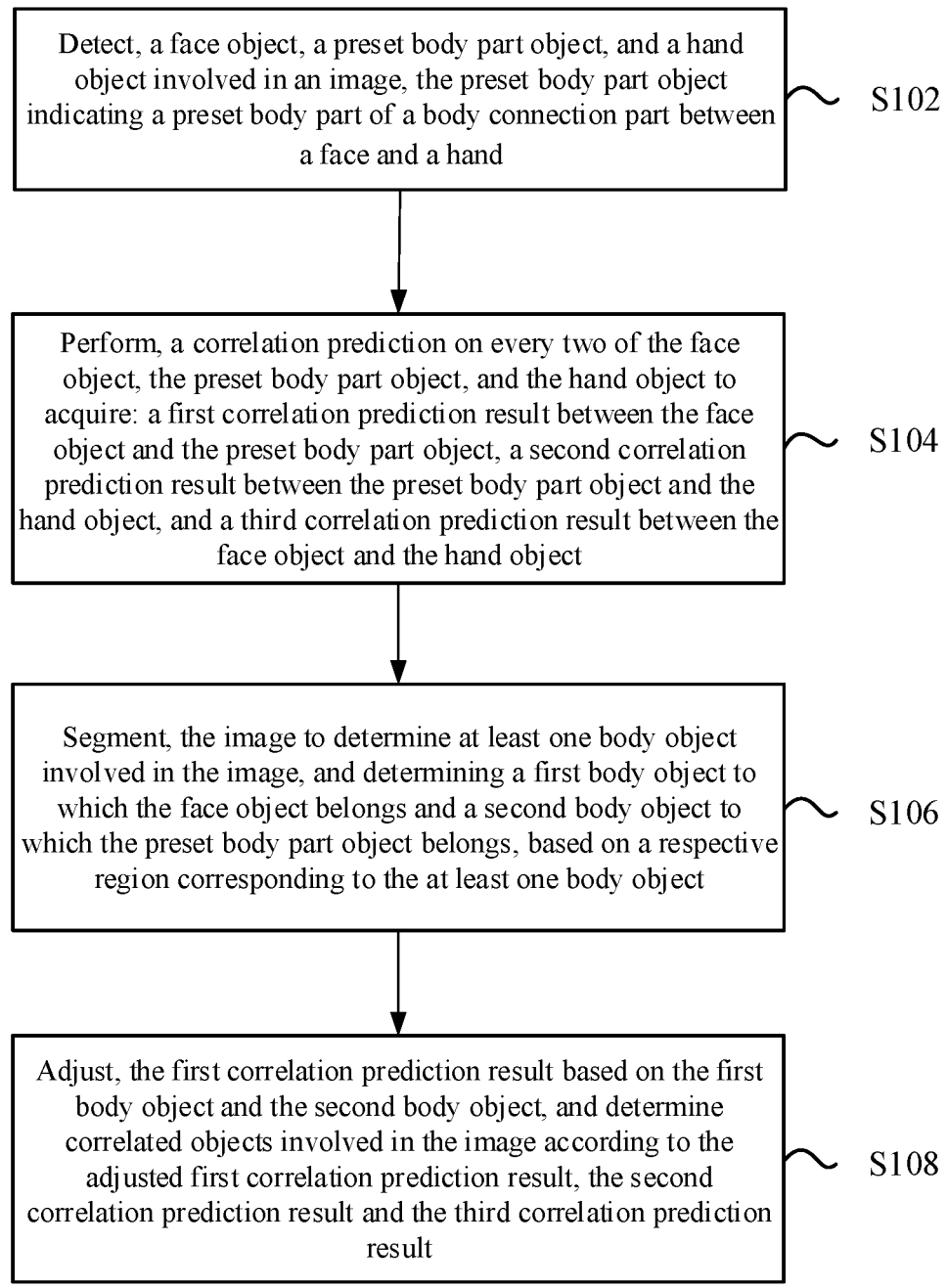
FIG. 1 illustrates a flowchart of a method of detecting correlated objects involved in an image according to an embodiment of the present disclosure.

Please refer to FIG. 1, which illustrates a flowchart of a method of detecting correlated objects involved in an image according to an embodiment of the present disclosure. As illustrated in FIG. 1, the method may include:

S102: a face object, a preset body part object and a hand object involved in an image are detected; wherein the preset body part indicates a preset body part of a body connection part between a face and a hand.

S104: a correlation prediction is performed on every two of the face object, the preset body part object, and the hand object to acquire: a first correlation prediction result between the face object and the preset body part object, a second correlation prediction result between the body part object and the hand object, and a third correlation prediction result between the face object and the hand object.

S106: Segmentation is performed on the image to determine at least one body object so as to acquire respective regions corresponding to the at least one body object, and a first body object to which the face object belongs and a second body object to which the preset body parts respectively belongs are determined based on a respective region corresponding to the at least one body object.

S108: The first correlation prediction result is adjusted based on the first body object and the second body object, and correlated objects involved in the image are determined according to the adjusted first correlation prediction result, the second correlation prediction result and the third correlation prediction result.

The method of detecting correlated objects can be applied to an electronic device. The electronic device may execute the image processing method by installing a software system corresponding to the method of detecting correlated objects. In the embodiments of the present disclosure, the electronic device may be a notebook computer, a computer, a server, a mobile phone, a PAD terminal, and etc., which is not limited in the present disclosure.

It should be understood that the method of detecting correlated objects may be performed by the terminal device or the server device alone, or may be performed by the terminal device along with the server device.

For example, the method of detecting correlated objects can be incorporated in a client. After receiving a request to detect correlated objects, the terminal device carrying the client may provide computing power through its own hardware environment to perform the method of detecting correlated objects.

For another example, the method of detecting correlated objects can be integrated in a system platform. After receiving a request to detect correlated objects, the server device equipped with the system platform may provide computing power through its own hardware environment to perform the method of detecting correlated objects.

For another example, the method of detecting correlated objects may be divided into two tasks: a task of acquiring an image and a task of detecting correlated objects involved in the image, wherein the task of acquiring an image may be integrated in a client side and installed on a terminal device. The task of detecting correlated objects involved in the image may be integrated in a server end and may be installed in a server end device. The client may initiate a request to detect correlated objects to the server end device after acquiring an image. In response to the request, the server end device may perform the method of detecting correlated objects involved in the image.

Description will be given hereinafter by taking an electronic equipment as executive body as an example.

Figure 2:
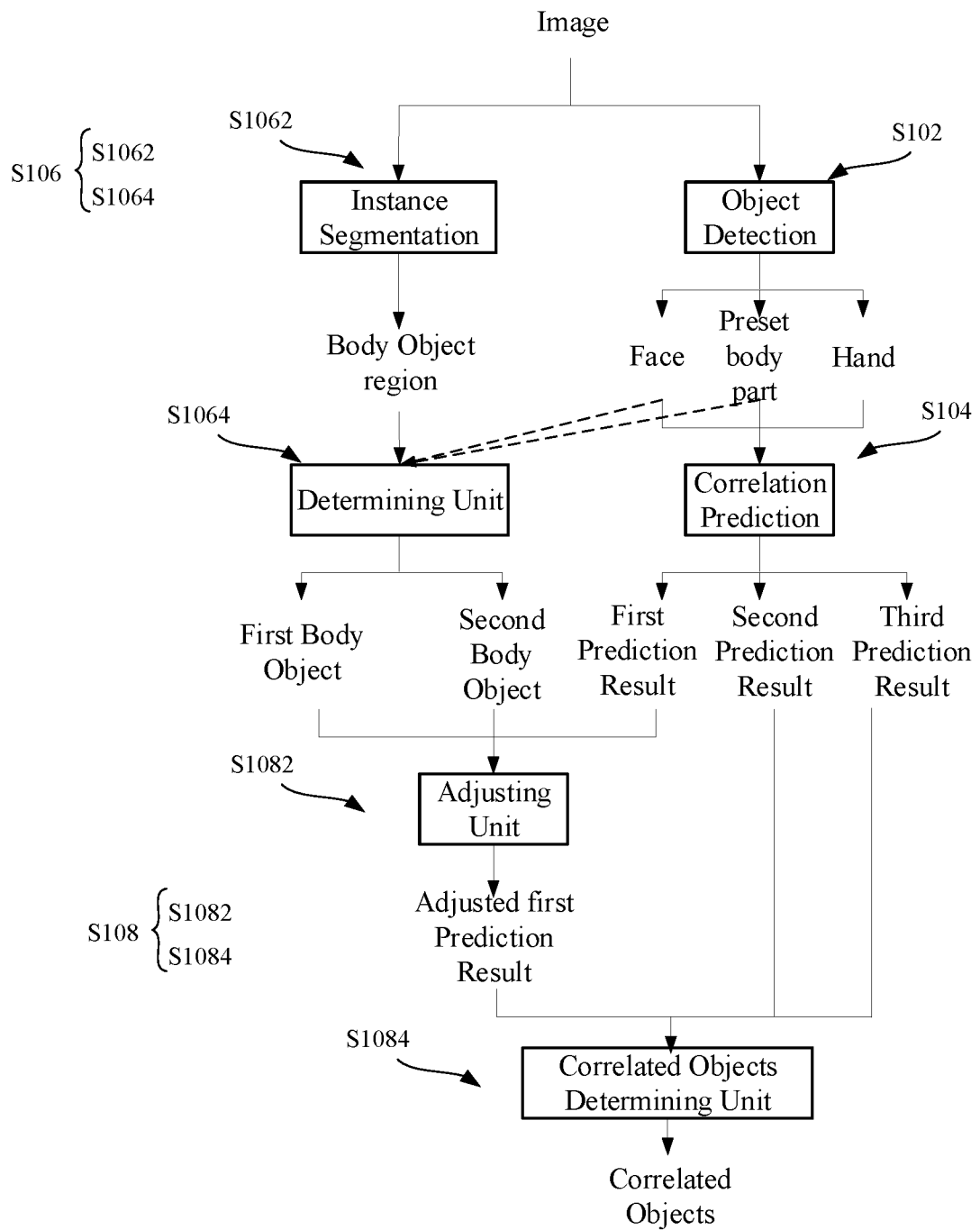
FIG. 2 illustrates a schematic view of a method of detecting correlated objects according to an embodiment of the present disclosure.

Please refer to FIG. 2, which illustrates a schematic diagram of a method of detecting correlated objects according to an embodiment of the present disclosure.

In the method as illustrated in FIG. 2, a face object and a hand object that are correlated to each other in an image may be determined.

The image is an image to be processed. The image may include a plurality of objects under detection. For example, in a scene of board game, the image may include a plurality of body objects surrounding the board, face objects, preset body part objects, and hand objects of the body objects.

In some embodiments of the present disclosure, in a case of acquiring the image, an image may be input into a device through interacting with a user. For example, the device may provide a window for the user to input an image to be processed through its equipped interface. The user may input the image through the window.

In some embodiments of the present disclosure, the device may further be connected to an image pickup device deployed on site, so that the device may acquire an image collected by the image pickup device.

Please continue to refer to FIG. 2. After acquiring the image, the device may perform the S102 to detect a face object, a preset body part object, and a hand object involved in the image; wherein the preset body part object indicates a preset body part of a connection part between a face and a hand.

The connection part between the face and the hand includes a neck, a shoulder, an arm, and a wrist. The preset body part object indicates a certain body part of the connection part. In some embodiments of the present disclosure, in order to improve the accuracy of correlation prediction, the preset body part object may be a joint part that is easier to be detected by means of joint detection, such as at least one of the shoulder object or the elbow object. In some embodiments of the present disclosure, the preset body part objects may further indicate parts such as an upper arm, a forearm, and a wrist. In this way, by taking the preset body part object as an intermediary, it is possible to correlate the face object with the body object which is far away from the face object more accurately.

In this step, the image may be input into an object detecting model for calculation, so as to detect bounding boxes corresponding to the face objects, the hand objects and the preset body part objects involved in the image. It should be understood that in a case that the bounding boxes corresponding to each object involved in the image are detected, it is considered that the face object, the preset body part object and the hand objects involved in the image are detected.

The object detecting model may be a deep convolutional network model for detecting objects. For example, the object detecting model may be a model based on Region Convolutional Neural Networks (RCNN), Fast Region Convolutional Neural Networks (FAST-RCNN) or FASTER-RCNN.

In practical applications, before detecting objects with the object detecting model, the object detecting model may be trained with a plurality of image training samples labeled with true values of a bounding box of the face object, a bounding box of the hand object, and a bounding box of the body part object until the object detecting model converges.

Figure 3:
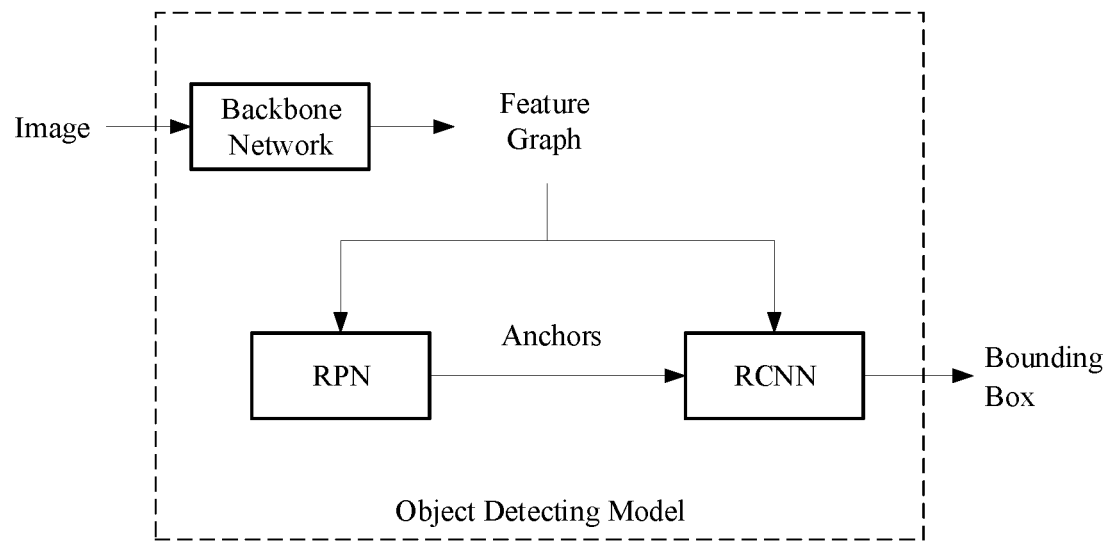
FIG. 3 illustrates a schematic view of detecting an object according to an embodiment of the present disclosure.

Please refer to FIG. 3, which illustrates a schematic view of detecting objects according to an embodiment of the present disclosure. It should be noted that FIG. 3 only schematically illustrates the process of detecting objects, and does not limit the present disclosure.

As illustrated in FIG. 3, the object detecting model may be a model based on the FASTER-RCNN. The object detecting model may include at least a backbone network, Region Proposal Networks (RPN), and Region-based Convolutional Neural Networks (RCNN).

The backbone network may perform a plurality of convolution operations on the image so as to acquire a feature graph of the image. After acquiring the feature graph, the feature graph may be input into the RPN so as to acquire a plurality of anchors. After acquiring the plurality of anchors, the plurality of anchors and the feature graph may be input into a corresponding RCNN for bounding box regression and for bounding box classification, so as to acquire a first bounding box for the face object, a second bounding box for the preset body part object and a bounding box for the hand object.

It should be understood that acquiring each bounding box in this step may include acquiring a position and a size of each bounding box, wherein the position information may include coordinates of the vertices of each bounding box, and may further include length and width information of each bounding box.

After determining the first bounding box for the face object, the bounding box for the hand object, and the second bounding box for the preset body part object respectively, S104 may be performed to acquire a first correlation prediction result between the face object and the preset body part object, a second correlation prediction result between the preset body part object and the hand object, and a third correlation between the face object and the hand object by performing a correlation predictions on every two of the face object, the preset body part object, and the hand object.

The correlation prediction refers to predicting a probability that two body parts are correlated objects, and herein, the correlated objects refer to two body part objects belonging to one person.

In some embodiments of the present disclosure, the correlation prediction results may be acquired by performing a correlation prediction with a correlation predicting model built based on a neural network.

The correlation prediction result (including the first correlation prediction result, the second correlation prediction result, and the third correlation prediction result, etc.) may indicate a probability that two body parts are correlated objects. In some embodiments of the present disclosure, a result of the correlation prediction may be quantified with a correlation prediction score. The higher the correlation prediction score, the higher the probability that the two body parts corresponding to the correlation prediction score belong to one person.

For example, in a board game scene, performing the correlation prediction on the face objects and the hand objects involved in the image may be predicting probabilities that any of the face objects detected in the image and any of the hand objects detected in the image are correlated objects based on the correlation predicting model.

It should be understood that the image may include a plurality of face objects, a plurality of preset body part objects, and a plurality of hand objects in most cases. In such cases, upon determining the first correlation prediction result, the face objects and the preset body part object detected in the image may be combined in pair arbitrarily, and a first correlation prediction result of each combination may be determined. Similarly, upon determining the second correlation prediction result, the preset body part objects involved in the image and the hand objects involved in the image may be combined in pair arbitrarily, and a second correlation prediction result of each combination may be determined. Upon determining the third correlation prediction result, the face objects and the hand objects involved in the image may be combined in pair arbitrarily, and a third correlation prediction result of each combination may be determined.

In some embodiments of the present disclosure, in a case that S104 is performed, prediction may be performed on the correlation between the face objects and the preset body part objects, the correlation between the preset body part objects and the hand objects, and the correlation between the face objects and the hand objects, respectively, so as to acquire the corresponding correlation prediction results.

It should be understood that manners of determining the three correlation prediction results may be referred to each other, and determining the first correlation prediction result is described hereinafter as an example.

For example, S1042 may be performed first to combine each detected face objects with each preset body part objects in pair so as to acquire a plurality of combinations.

In this step, identifiers may be created for each detected face objects, each detected hand objects, and each detected preset body part objects. The identifiers for the objects correspond to the objects in a one-to-one manner. For example, face object identifiers correspond to the face objects in a one-to-one manner, hand object identifiers correspond to the hand objects in a one-to-one manner. It should be noted that, in practical applications, the identifiers may be part numbers, such as face object 1, face object 2, hand object 1, preset body part object 1, and so on.

After the identifiers are created, each face object may be combined with each preset body object according to their identifiers (for example, number sequence) to acquire a plurality of combinations.

After acquiring the plurality of combinations, S1044 may be executed. For each combination, a correlation prediction is performed, by a correlation predicting branch for predicting a correlation between the face object and the preset body part object (hereinafter referred to as a first branch), and a first correlation prediction result between the face object and the preset body part object may be acquired according to respective region features and respective position information corresponding to the face object and the preset body part object.

The first branch may be a correlation predicting model based on convolutional neural networks. The correlation predicting branch can acquire a first correlation prediction result by performing a correlation prediction on the face object and the preset body part object. It should be understood that the correlation predicting branch may include a fully connected layer, the first correlation prediction score are finally output.

In some embodiments of the present disclosure, the fully connected layer may be a calculating unit based on a regression algorithm such as linear regression or least square regression. The calculating unit may acquire a corresponding correlation prediction score by performing feature mapping on a region feature. Here, the region feature indicates a feature of a region where a corresponding object is located in the image (for example, an area of a bounding box for the object involved in the image), such as a feature graph and a pixel matrix of the region where the object is located.

In practical applications, the first branch may be trained with a plurality of image training samples having correlation label information between the face object and preset body part object before performing a correlation prediction.

It should be understood that a plurality of image training samples may be constructed first in a case of training the face objects and the preset body part objects. In the case of constructing the plurality of image training samples, a plurality of original images may be acquired first. After acquiring the plurality of original images, label tools may be used to arbitrarily combine the face objects involved in the original images with the preset body part objects involved in the original images to acquire a plurality of combinations. Then, a correlation label is performed for the face objects and the preset body part object of each combination. In some embodiments of the present disclosure, in a case that the face object and the preset body part object of the combination are correlated (i.e., belonging to one person), it may be labeled with 1, otherwise it may be labeled with 0. Or, in a case of labeling the original image, information (such an identifier) of a person object that each face object and each preset body part object belong to may be labeled, so that it may be determined whether the face object and the preset body part object of a combination are correlated according to whether the information of person objects to which the face object and the preset body part object respectively belongs to are same.

After constructing the image training samples, the first branch may be trained based on a conventional model training method until the first branch converges.

Figure 4:
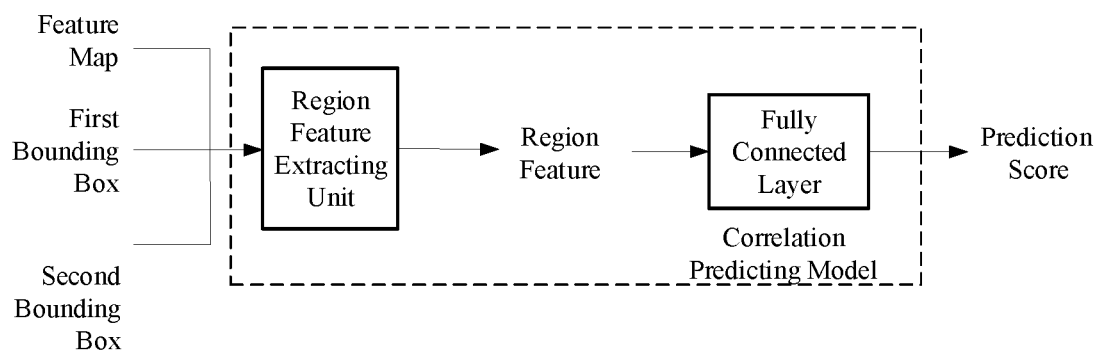
FIG. 4 illustrates a schematic view of performing a correlation prediction according to an embodiment of the present disclosure.

Please refer to FIG. 4, which illustrates a schematic diagram of correlation prediction according to an embodiment of the present disclosure. Schematically, a first branch as illustrated in FIG. 4 may include a region feature extracting unit and a fully connected layer. The region feature extracting unit may acquire a region feature of a face object and a region feature of a preset body part object according to a bounding box for the face object, a bounding box for the preset body part object and a feature graph of the image.

It should be understood that, in some embodiments of the present disclosure, the region feature of the face object and the region feature of the preset body part object may be present on a feature graph, that is, a feature graph includes a characteristic part of the face object and a characteristic part of the preset body part object. After acquiring the feature graph, a corresponding correlation prediction result may be acquired by performing feature mapping (matrix operation) on the feature graph.

In other embodiments of the present disclosure, a region feature of the face object and a region feature of the preset body part object may be present on at least two feature graphs. After acquiring a feature graph of the face object and a feature graph of the preset body part object, a spliced feature graph may be acquiring by inputting the feature graph of the face object and the feature graph of the preset body part object into the fully connected layer for feature splicing. After acquiring the spliced feature graph, a corresponding correlation prediction result may be acquired by performing feature mapping (matrix operation) on the spliced feature graph.

The region feature extracting unit may be a Region of interest Align (ROI Align) unit or a Region of interest (ROI) pooling unit.

In some embodiments of the present disclosure, the fully connected layer may be a calculating unit based on a regression algorithm such as linear regression and least square regression. The calculating unit may perform matrix operations on the region features (such as a feature graph, a pixel matrix) to acquire a corresponding correlation prediction score.

In a case of performing prediction with the first branch, a combination of each face object and the preset body part object may be sequentially determined as a current combination, and then a region feature of the face object of the current combination and a region feature of the preset body part object of the current combination are input into the first branch for calculation, and a correlation prediction score (a first correlation prediction score) between the face object and the preset body part object of the current combination is acquired.

In some embodiments of the present disclosure, in order to improve the accuracy of correlation prediction, in a case of performing prediction for the first correlation prediction score, the first branch can be used to perform correlation prediction on the face object and the preset body part object of the current combination based on a region feature and position information of the face object and a region feature and position information of the preset body part object, to acquire a first correlation prediction result between the face object and the preset body part object.

Figure 5:
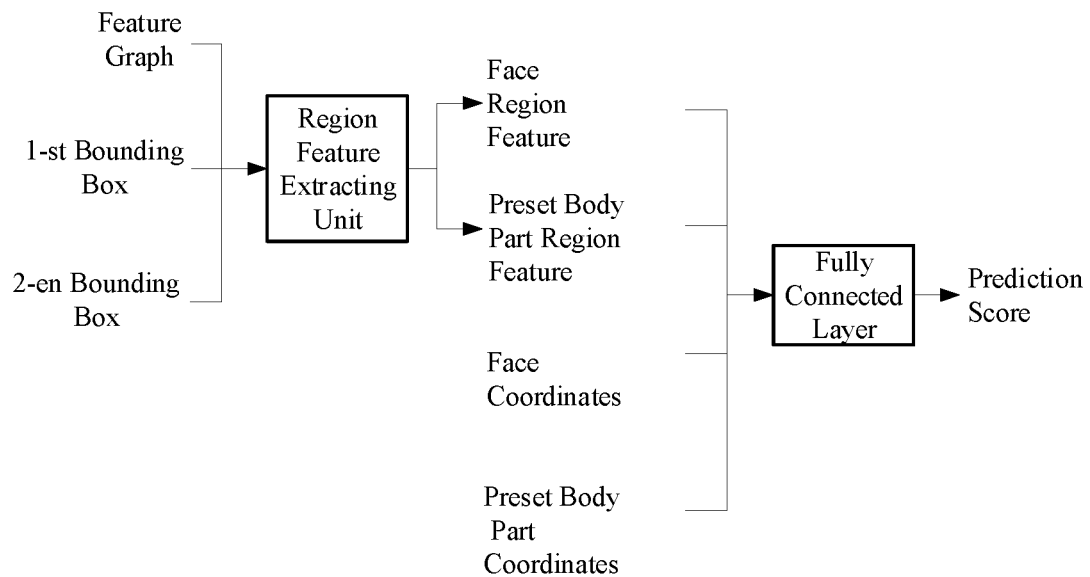
FIG. 5 illustrates a schematic view of performing a correlation prediction according to an embodiment of the present disclosure.

Please refer to FIG. 5, which illustrates a schematic diagram of a correlation prediction process according to an embodiment of the present disclosure. As illustrated in FIG. 5, after extracting a feature of the face object and a feature of the preset body part with the region feature extracting unit, a spliced feature may be acquired by performing feature splicing (for example, single-core convolution operation) on position information (for example, coordinates) of the face object and position information of the preset body part on the position of the object (for example, coordinates) to acquire a spliced feature. After acquiring the spliced feature, the spliced feature may be input into the fully connected layer for feature mapping (matrix operation) to acquire the first correlation prediction score. In addition to the feature of the face object and the feature of the preset body part object, the position information of the first bounding box for the face object and the second bounding box for the preset body part object are also used to perform correlation prediction, so that information characterizing correlation in position between the face object and the preset body part object is introduced, thereby improving the accuracy of the acquired correlation prediction results. After the foregoing steps are performed for each combination, correlation prediction scores in a plurality of first correlation prediction result may be acquired.

In a case of predicting the correlation between the preset body part object and the hand object, S1046 may be performed to combine each detected preset body part object with each hand object in pair such that a plurality of combinations are acquired. S1048: For each combination, a correlation predicting branch for predicting the correlation between the preset body part object and the hand object performs a correlation prediction on the preset body part object and the hand object according to respective region features and respective position information corresponding to the preset body part object and the hand object of the current combination, so as to acquire a second correlation prediction result between the preset body part object and the hand object.

After the foregoing steps are performed for each combination, correlation prediction scores of a plurality of second correlation prediction scores may be acquired.

It should be understood that the steps described in S1046-S1048 may refer to the step described in S1042-S1044, which will not be elaborated here.

In a case of performing a correlation prediction between the face object and the hand object, reference may also be made to the S1042-S1044, which will not be elaborated here.

It should be noted that the present disclosure does not specifically limit the sequence of determining the first correlation prediction result, the second correlation prediction result, and the third correlation prediction result. For example, the three correlation prediction results may be determined according to a preset order, or may be determined simultaneously.

In some embodiments of the present disclosure, in a case of performing S104, the detected face object, the detected preset body part object, and the detected hand object may be input into a correlation predicting model for calculation, so as to acquire the first correlation prediction result, and the second correlation prediction result, and the third correlation prediction result.

The correlation predicting model may be a classification model including a multiclass classifier. Output of the multiclass classifier may include at least the first correlation prediction result, the second correlation prediction result, and the third correlation prediction result.

In a case of training the correlation predicting model, image training samples may be constructed first. In a case of constructing the image training samples, original images may be acquired first. After acquiring the original images, the image training samples labeled with true values may be acquired by labeling, with an image labeling tool, a first correlation prediction result between the face object and the preset body part object, a second correlation prediction result between the preset body part object and the hand object, and a third correlation prediction result between the hand object and the face object, of each triad in the original image. After constructing the image training samples, the correlation predicting model may be trained with the constructed image training samples until the correlation predicting model converges.

In this step, a plurality of triads may be acquired by combining any detected face object, any detected preset body part object, and any detected hand object. And then, each triad may be taken as a current triad in sequence, and a face object, a preset body part object, and a hand object of the current triad are input into the trained correlation predicting model for calculation, to acquire a first correlation prediction result between the face object and the preset body part object, a second correlation prediction result between the preset body part object and the hand object, and a third correlation prediction result between the face object and the hand object, of the triad. It should be noted that a structure of the correlation predicting model may be refer to the structure of the first branch, which is not elaborated here.

Please continue to refer to FIG. 2. After acquiring the first correlation prediction result, the second correlation prediction result, and the third correlation prediction result, S106 may be performed to segment the image to determine at least one body object, so as to determine, based on a respective region corresponding to the at least one body object, a first body object to which the face object belongs and a second body object to which the preset body part object belongs.

It should be understood that S106 can actually be divided into two steps, namely S1062 and S1064. In S1062, the image is segmented to determine at least one body object involved in the image and to acquire a respective region of the at least one body object, and in S1064, a first body object to which the face object belongs and a second body object to which the preset body part object belongs are determined according to the respective region of the body object.

In some embodiments of the present disclosure, in a case of performing S1062, the image may be input into an instance segmenting model based on deep convolutional neural networks for calculation, to determine at least one body object involved in the image, and a respective region of the at least one body object.

In some embodiments of the present disclosure, the instance segmenting model may be a model for segmenting instance. For example, the instance segmenting model may be a model based on Faster Region Convolutional Neural Networks (Faster-RCNN) or MASK Region Convolutional Neural Networks (MASK-RCNN).

In practical applications, before segmenting an instance with the instance segmenting model, the model may be trained with a plurality of image training samples labeled with bounding boxes for body objects until the model converges.

In a case of constructing the image training samples, an original image may be acquired first. And then, a labeling tool may be used to determine at least one body object involved in the original image. Next, a bounding box for the at least one body object or a profile of the at least one body object may be labeled with the labeling tool. Upon labeling, pixels in a respective bounding box for the at least one body object may be labeled with different pixel values. For example, the original image involves a body object A, a body object B, and a body object C. Upon labeling, pixels in the bounding box for the body object A may be labeled with pixel value 1, pixels in the bounding box for the body object B may be labeled with pixel value 2, and pixels in the bounding box for the body object C may be labeled with pixel value 3. After the image training samples have been constructed, the instance segmenting model may be trained with a conventional model training method until the model converges.

Figure 6:
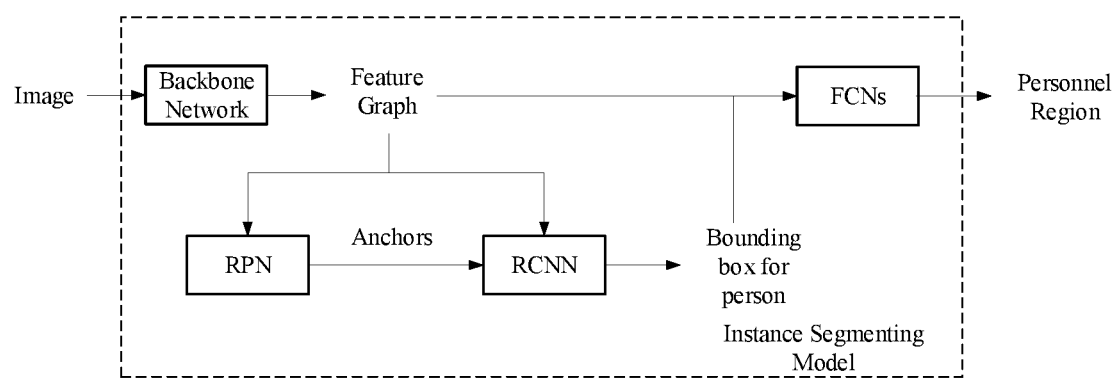
FIG. 6 illustrates a schematic view of segmenting an image according to an embodiment of the present disclosure.

Please refer to FIG. 6, which illustrates a schematic diagram of segmenting image according to an embodiment of the present disclosure. It should be noted that FIG. 6 only schematically illustrates image segmentation, and is not intended to limit the present disclosure. As illustrated in FIG. 6, the instance segmenting model may be a model based on the MASK-RCNN. The model may include at least a backbone network, a Region Proposal Network (RPN), a Region-based Convolutional Neural Network (RCNN), and a Fully Convolution Networks (FCNs). The backbone network may acquire a feature graph of the image by performing a plurality of convolution operations on the image. Then, a plurality of anchors may be acquired by inputting the feature graph into the RPN. Next, bounding box for each body object may be acquired by inputting the plurality of anchors and the feature graph into a corresponding RCNN for bounding box regression and classification. Region corresponding to each body object may be acquired by inputting the bounding box and the feature graph into the FCNs for semantic segmentation after acquiring the bounding box of each body object.

In some embodiments of the present disclosure, a Region of interest (ROI) Align unit may be connected before the FCNs. Then, the bounding boxes and the feature graph may be input into the ROI Align unit for region feature extraction before inputting the bounding boxes and the feature graph into the FCNs for semantic segmentation, and then the extracted region features are input into the FCNs for semantic segmentation.

It should be understood that acquiring each bounding box in this step may include acquiring position information and size of each bounding box. The position information may include position coordinates of the bounding box in a rectangular coordinate system constructed with the lower left vertex of the image as the origin.

After acquiring a respective region corresponding to the at least one body object by performing instance segmentation on the above image, S1064 may be performed, and a first body object to which the face object belongs and a second body object to which the preset body part object belongs are determined according to a respective region of the at least one body object acquired by segmentation.

In some embodiments of the present disclosure, in the case that the first body object to which the face object belongs and the second body object to which the preset body part object belongs are determined according to the respective region corresponding to the at least one body object acquired by segmentation, a first overlapping areas between the region corresponding to the face object and the respective region corresponding to the at least one body object may be determined according to the first bounding box for the face object, and a second overlapping area between the region corresponding to the preset body part object and the respective region corresponding to the at least one body object may be determined according to the second bounding box for the preset body part object. After the first overlapping area and the second overlapping area are determined, the first body object to which the face object belongs and the second body object to which the preset body part object belongs may be determined according to the first overlapping area and the second overlapping area.

Typically, for one body object, the first bounding box for the face object and the second bounding box for the preset body part object are located within the bounding box for the body object. Therefore, a size of the first overlapping area may characterize a possibility that the face object belongs to a certain body object, and a size of the second overlapping area may characterize a possibility that the preset body part object belongs to a certain body object. Taking a face object as an example, in a case that a first overlapping area between a face object A1 and a body object B is greater than a first overlapping area between a face object A2 and a body object B, it means that a possibility that the face object A1 belongs to the body object B is greater than a possibility that the face object A2 belongs to the body object B; or, in a case that a first overlapping area between a face object A1 and a body object B exceeds a predetermined interval (for example, the overlapping area exceeding 80% of area of the region corresponding to the face object), it means that a possibility or a probability value that the face object A1 belongs to the body object B is high. At this time, it may be directly determined that the face object A1 belongs to the body object B, or, the body object B is added to a candidate body object set to which the face object A1 belongs, and a body object that the face object belongs to is determined according to a ranking of probability values that the face object A1 belongs to respective body object in the candidate body object set.

It should be understood that, in a case that at least two face objects belong to a same body object in the process of determining the first body object to which the face object belongs and the second body object to which the preset body part object belongs according to the first overlapping area and the second overlapping area, or in a case that at least three preset body part objects belongs to a same body object in a case that the preset body part object is an elbow object or a shoulder object, the face object and the preset body object that belong to the same body object are filtered according to a ranking of their overlapping area from the greatest to the smallest under a constraint that one body object is correlated to one face object, two elbow objects, and two shoulder objects at most, so as to decrease a possibility that a determination of the body object that the face object and the preset body object belong to is in conflict with the actual situation. Therefore, in this embodiment, by determining a first overlapping area between a region corresponding to a face object and a respective region corresponding to at least one body object and a second overlapping area between a region corresponding to a preset body part object and the respective region corresponding to the at least one body object, a first body object to which the face object belongs and a second body object to which the preset body part object belongs may be determined.

In some embodiments of the present disclosure, in a case of determining the first body object to which the face object belongs according to the first overlapping area and determining the second body object to which the preset body part object belongs according to the second overlapping area, a first target region is selected from the respective region corresponding to the at least one body object, where the first overlapping area between the first target region and the region corresponding to the face object is greatest among overlapping areas between the region corresponding to face object and candidate regions from the particular region, and a second target region is selected from the respective region corresponding to the at least one body object, where the second overlapping area between the second target region and the region corresponding to the preset body part object is greatest among overlapping areas between the region corresponding to preset body part object and candidate regions from the particular region. After determining the first target region and the second target region, a body object corresponding to the first target region is taken as the body object to which the face object belongs, and a body object corresponding to the second target region is taken as the body object to which the preset body part object belongs.

Since the first target region is the region which has a greatest first overlapping area with the region corresponding to the face object, and the second target region is the region which has a greatest second overlapping area with the region corresponding to the preset body part region, thus, in the present embodiment, the first body object to which the face object is most likely to belong and the second body object to which the preset body part object is most likely to belong are determined, thereby improving the accuracy of detecting correlated objects. In some embodiments of the present disclosure, in the case of determining the first target region, pixels in the region corresponding to the face object with a same pixel value are grouped, so that a plurality of classification groups are acquired. It should be understood that, as different pixel values indicate different body object regions, after the pixels are classified, each classification group can indicate one of the respective region corresponding to the at least one body object.

After the pixels are classified, the number of pixels of each classification group can be counted, and a region corresponding to a body object corresponding to a classification group with a greatest number of pixels is determined as the first target region. For example, it is assumed that a region corresponding to a face object have 100 pixels, wherein 80 pixels correspond to a region corresponding to a body object A, 15 pixels correspond to a region corresponding to a body object B, and 5 pixels correspond to a region corresponding to a body object C. Then, the region corresponding to the body object A is taken as the first target region. It should be noted that a manner of determining the second target area may refer to the manner of determining the first target area, which is not elaborated here.

In some embodiments of the present disclosure, an IoU (Intersection over Union) algorithm or the like may further be used to determine the first target region and the second target region.

In some embodiments of the present disclosure, in the case of determining the first body object to which the face object belongs and the second body object to which the preset body part object belongs according to the respective region corresponding to the at least one body object acquired by segmentation, after determining the first overlapping area and the second overlapping area, an unified area of the region corresponding to the face object and the region corresponding to the body object and an unified area of the region corresponding to the preset body part object and the region corresponding to the body object are determined respectively according to the region corresponding to the face object and the region corresponding to the preset body part object.

After determining the unified area, a first IoU value set of the face object may be acquired by dividing the overlapping area between the face object and the body object with the unified area of the region corresponding to the face object and the region corresponding to the body object according to the IoU algorithm. Similarly, a second IoU value set of the preset body part object may be acquired.

After determining the first IoU value set and the second IoU value set, the third IoU value with the largest value of the first IoU value set and the fourth IoU value with the largest value of the second IoU value set may be determined. After that, a body object corresponding to the third IoU value is determined as the first body object to which the face object belongs and a body object corresponding to the fourth IoU value is determined as the second body object to which the preset body part object belongs.

The IoU value may indicate the possibility that the face object or the preset body part object belongs to a certain body object. For example, in a case that the IoU value between a certain face object and a certain body object is large, it means that the possibility that the face object belongs to the body object is great.

Since the third IoU value is a maximum value of the first IoU value set, and the fourth IoU value is a maximum value of the second IoU value set, in the present embodiment, the first body object to which the face object is most likely to belong and the second body object to which the preset body part object is most likely to belong are determined, thereby improving the accuracy of detecting correlated objects.

In some embodiments of the present disclosure, in the case of performing S1064, it may occur that the first body object to which the face object belongs or the second body object to which the preset body part object belongs cannot be determined. In such a situation, the correlation prediction result related to the face object or the correlation prediction result related to the preset object may not be adjusted.

For example, in a case of determining the first body object to which the face object belongs, it may occur that respective regions corresponding to a plurality of body objects that overlap with the region corresponding to the face object may have substantially the same overlapping area with the region corresponding to the face object. In such a situation, it may be considered that the first body object to which the face object belongs cannot be determined and the correlation prediction result related to the face object may not be adjusted.

Please continue to refer to FIG. 2, after determining the first body object to which the face object belongs and the second body object to which the preset body object belongs involved in the image, operation proceeds to S108, the first correlation prediction result is adjusted according to the first body object and the second body object and correlated objects involved in the image may be determined according to the adjusted first correlation prediction result, the second correlation prediction result and the third correlation prediction result.

It should be understood that S108 can actually be divided into two steps, namely S1082 and S1084. In S1082, the first correlation prediction result is adjusted according to the first body object and the second body object. And in S1084, correlated objects involved in the image are determined according to the adjusted first correlation prediction result, the second correlation prediction result and the third correlation prediction result.

In some embodiments of the present disclosure, in a case of performing S1082, a matching result may be acquired by comparing the first body object to which the face object belongs with the second body object to which the preset body part object belongs. After acquiring the matching result, the first correlation prediction result may be adjusted according to the matching result.

In a case that the first body object to which the face object belongs is consistent with the second body object to which the preset body part object belongs, it means that the probability that the face object and the preset body part object belong to one person is great. Thus, in the present embodiment, the first correlation prediction result is adjusted according to the matching result, and the possibility that the face object and the preset body part object corresponding to the first correlation prediction result belong to one person is improved by adjusting the first correlation prediction result, thereby improving the accuracy of detecting correlated objects.

It should be understood that, since the image involves a plurality of combinations of face object and preset body part object, a plurality of first correlation prediction results may be determined in the case of performing S104. And then, in the case of performing S1082, the plurality of first correlation prediction results may be taken as a current first correlation prediction result in sequence and following operation is performed: acquiring a matching result by comparing the first body object to which a face object corresponding to the correlation prediction result belongs with the second body object to which a preset body part object corresponding to the current first correlation prediction result belongs. After that, the current first correlation prediction result may be adjusted according to the matching result.

In some embodiments of the present disclosure, the first correlation prediction result may be adjusted according to the following ideas. The correlation prediction result may include a correlation prediction score. The higher the correlation prediction score, the stronger the correlation therebetween. The correlation prediction score in the first correlation prediction result is increased in response to determining the first body object matches the second body object; and/or, the correlation prediction score in the first correlation prediction result is reduced in response to determining the first body object does not match the second body object.

In the present embodiment, in the case that the first body object matches the second body object, the correlation prediction score in the first correlation prediction result may be increased, and/or, in the case that the first body object does not match the second body object, the correlation prediction score in the first correlation prediction result is decreased. Therefore, it may increase the correlation prediction score in the first correlation prediction result between the face object and the preset body part object that belong to one person, and/or decrease the correlation prediction score in the first correlation prediction result between the face object and the preset body part object that do not belong to one person, thereby improving the accuracy of detecting correlated objects.

It should be noted that the present disclosure does not limit how to increase and decrease the correlation prediction score in the first correlation prediction result. For example, in the case of increasing or decreasing the correlation prediction score in the first correlation prediction result, a preset value may be increased or decreased on the basis of an original correlation prediction score in the first correlation prediction result.

In some embodiments of the present disclosure, in addition to the respective regions corresponding to various body objects involved in the image, the segmentation result acquired by performing instance segmentation on the image further includes a confidence score indicating the accuracy of the instance segmentation result. At this time, in the case of increasing the correlation prediction score in the first correlation prediction result between the face object and the preset body part object, the correlation prediction score in the first correlation prediction result may be increased to a confidence score corresponding to the first body object to which the face object belongs. In the case of decreasing the correlation prediction score in the first correlation prediction result, the original correlation prediction score in the first correlation prediction result may be halved.

In some embodiments of the present disclosure, in the case of performing S1064, it may occur that a first body object to which the face object belongs or a second body object to which the preset body part object belongs cannot be determined. In such a situation, the correlation prediction results corresponding to the face object or the preset body part object may not be adjusted.

Please continue to refer to FIG. 2. After adjusting the first correlation prediction result, operations proceeds to S1084, and correlated objects involved in the image may be determined according to the adjusted first correlation prediction result, the second correlation prediction result, and the third correlation prediction result.

In some embodiments of the present disclosure, in a case that the image involves only one face object, one preset body part object, and one hand object, upon determining correlated objects involved in the image, a summation result may be obtained by performing summation on a correlation prediction score in the first correlation prediction result, a correlation prediction score in the second correlation prediction result and a correlation prediction score in the third correlation prediction result. And then, it is determined whether the summation result reaches a preset standard value. In response to the determination result "yes", it can be considered that the face object and the hand object involved in the image are correlated objects. In some embodiments of the present disclosure, the preset standard value may be an empirical threshold value that can be set according to actual situations. For example, the preset standard value may be 0.95.

In a case that the image involves a plurality of face objects, a plurality of preset body part objects, and a plurality of hand objects, upon determining correlated objects involved in the image, the face objects, the preset body part objects, and the hand objects detected in the image may be combined so as to generate at least one triad, wherein each triad includes a face object, a preset body part object, and a hand object. After acquiring a plurality of triads, correlated objects involved in the image may be determined.

In some embodiments of the present disclosure, fourth correlation prediction result of each triad may be first determined according to the adjusted first correlation prediction result, and the second correlation prediction result and the third correlation prediction result.

In some embodiments of the present disclosure, the fourth correlation prediction results may include a correlation prediction score. In a case of determining correlation prediction scores in the correlation prediction results of the plurality of triad respectively, each triad of the plurality of triads may be sequentially determined as the current triad. And then, a summation of the adjusted correlation prediction score in the first correlation prediction result between the face object and the preset body part object, the correlation prediction score in the second correlation prediction result between the preset body part object and the hand object, and the correlation prediction score in the third correlation prediction result between the face object and the hand object of the current triad, is determined as a correlation prediction score in the correlation prediction result of the current triad.

It should be noted that, how the correlation prediction score of the triad is determined according to the adjusted correlation prediction score in the first correlation prediction result, the correlation prediction score in the second correlation prediction result and the correlation prediction score in the third correlation prediction result is not limited in the present disclosure. For example, the correlation prediction score in the correlation prediction result of the triad may further be determined according to a product, a weighted summation, or a mean of the adjusted correlation prediction score in the first correlation prediction result, the correlation prediction score in the second correlation prediction result and the correlation prediction score in the third correlation prediction result.

After acquiring the respective correlation prediction results of the plurality of triads, correlated objects involved the image may be determined according to the correlation prediction results of each triad.

The fourth correlation prediction result of each triad may characterize a possibility that the face object and the hand object of the triad belong to one person. For example, in the case that the fourth correlation prediction result is indicated by the correlation prediction score in the fourth correlation prediction result, a high correlation prediction score in the fourth correlation prediction result means that the face object and the hand object of the triad corresponding to the correlation prediction result belong to one person with a great possibility.

Therefore, in the present embodiment, by determining the correlated objects involved the image according to the fourth correlation prediction result of each triad, the face object and the hand object that are correlated tightly in the triad may be determined as the correlated object, thereby improving the accuracy of detecting correlated objects.

In some embodiments of the present disclosure, in the case of determining the correlated objects involved in the image according to the fourth correlation prediction result of each triad, the face object and the hand object of the triad with high correlation prediction score in the fourth correlation prediction result may be determined as the hand object and face object that are correlated.

The high correlation prediction score in the fourth correlation prediction result indicates a strong correlation between the face object and the hand object in the triad. Therefore, in some embodiments of the present disclosure, whether the face object and the hand in the triad are correlated objects may be determined according to the ranking of the correlation scores from high to low.

In actual situations, usually one face object can only correspond to two hand objects at most and one hand object can only correspond to one face object at most. In order to meet the above actual situation, in some embodiments of the present disclosure, in the case of determining the face object and the hand object of the triad with higher correlation prediction scores as the face object and hand object that are correlated, and a current triad is selected from respective triads according to an order of the correlation prediction scores in the fourth correlation prediction results of the respective triads from high to low, and for the current triad, the followings are performed: determining, based on the determined correlation objects, whether the number of correlated hand objects that are correlated with the face object involved in the current triad reaches a first preset threshold, and whether the number of correlated face objects that are correlated with the hand objects involved in the current triad reaches a second preset threshold.

The first preset threshold may be an empirical threshold that may be set according to actual situations. For example, the first preset threshold may be 2.

The second preset threshold may be an empirical threshold that may be set according to actual situations. For example, the second preset threshold may be 1.

In some embodiments of the present disclosure, a counter may be established for each face object and each hand object. Whenever a hand object that is correlated with a face object is determined, a value of the counter of the correlated face object may be increased by 1. Then, in the case of determining whether the number of the correlated hand objects that are correlated with the face object in the triad reaches a first preset threshold based on the determined correlated objects, through determining whether the value of the counter of the correlated face object reaches the first preset threshold, whether the number of the correlated hand objects that are correlated with the face object reaches the first preset threshold may be determined. In the case of determining whether the number of the correlated face objects that are correlated with the hand objects in the current triad reaches the second preset threshold, through determining whether a value of the counter of the correlated hand object reaches the second preset threshold, whether the number of the correlated face objects that are correlated with the hand object reaches a second preset threshold may be determined.

In response to determining the number of the correlated hand objects that are correlated with the face object involved in the current triad does not reach the first preset threshold and that the number of the correlated face objects that are correlated with the hand object involved in the current triad does not reach the second preset threshold, the face object and the hand object of the current triad may be determined as correlated objects involved in the image.

Upon determining the correlated objects, in response to determining the number of the correlated hand objects that are correlated with the face object of the current triad does not reach the first preset threshold, and the number of the correlated face objects that are correlated with the hand objects of the current triad has not reached the second preset threshold, the face object and the hand object of the current triad may be determined as correlated objects. Therefore, it is possible to avoid situations in which one face object is correlated with more than two hand objects or one hand object is correlated with more than one face object.

In some embodiments of the present disclosure, after determining the correlated objects involved in the image, a result of detecting correlated objects involved in the image may be output. In some embodiments of the present disclosure, a contour box surrounding the face object and the hand object that are correlated with each other may be output on an image output device (for example, a display device). By displaying the contour box surrounding the correlated objects on the display device, the observer may conveniently and intuitively determine the correlated objects involved in the image displayed on the image output device, thereby facilitating further manual verification of the result of detecting the related objects.

The schemes for determining the correlated objects involved in the image according to the present disclosure are described above, methods of training various models will be described hereinafter.

Please continue to refer to FIG. 2. In the scheme illustrated in FIG. 2, an object detecting model built based on a neural network may be configured to detect a face object, a preset body part object, and a hand object involved in the image. A correlation predicting model built based on a neural network may be configured to perform a correlation prediction on every two of the face object, the preset body part object, and the hand object. An exemplary segmenting model built based on a neural network may be configured to segment the image to determine at least one body object involved in the image. It should be understood that the object detecting model, the instance segmenting model, and the correlation predicting model may share one backbone network.

In some embodiments of the present disclosure, respective training sample sets may be constructed for the object detection model, the instance segmenting model, and the correlation predicting model, and the object detecting model, the instance segmenting model, and the correlation predicting model are respectively trained with their respective training sample set.

In some embodiments of the present disclosure, each model may be trained in a multiple-stage training manner such that the accuracy of detecting correlated objects may be improved. A first stage is training for the object detection model and the instance segmenting model; and a second stage is a joint training for the object detecting model, the instance segmenting model, and the correlation predicting model.

Figure 7:
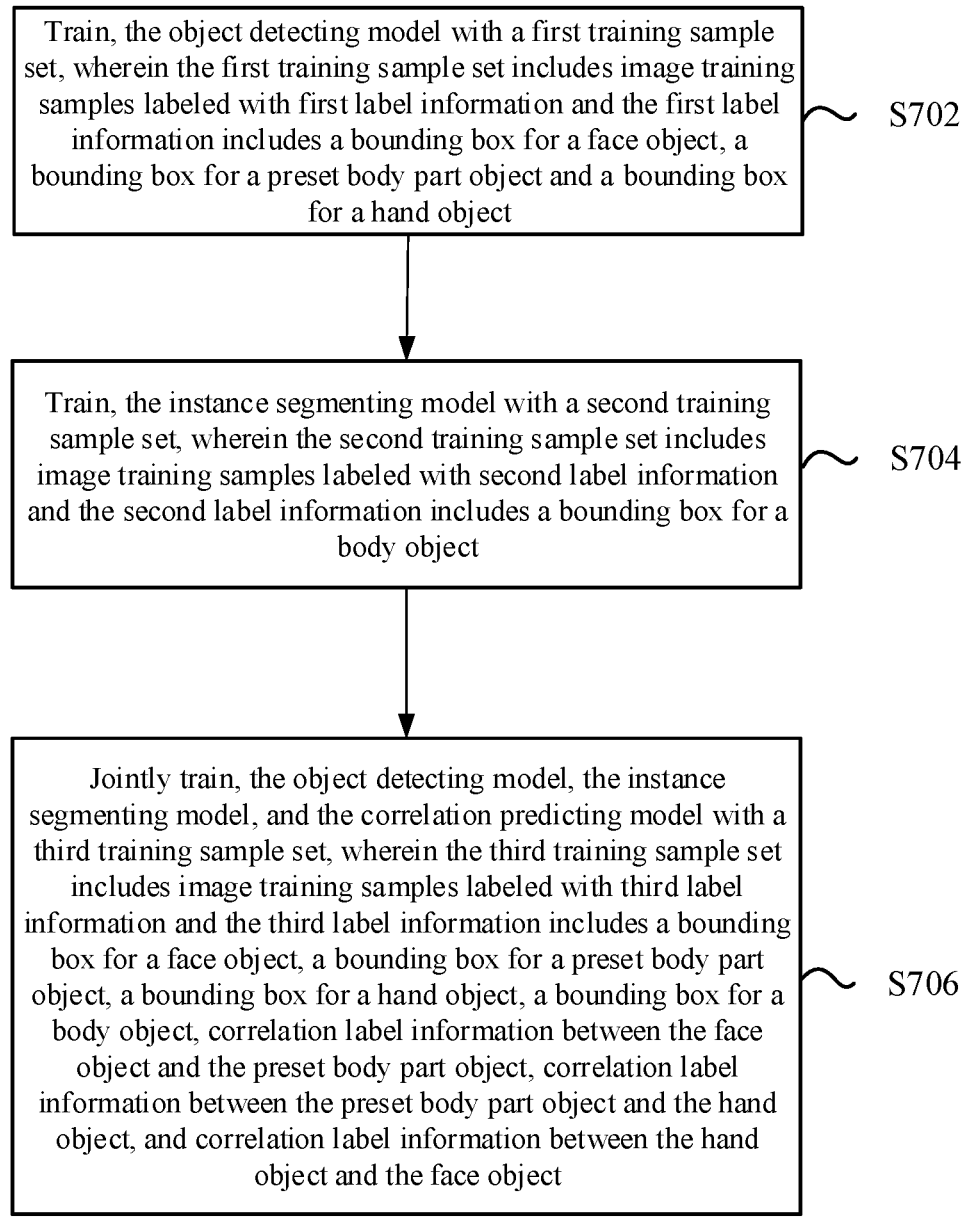
FIG. 7 illustrates a schematic flowchart of training a model according to an embodiment of the present disclosure.

Please refer to FIG. 7, which illustrates a schematic flowchart of a method of training model according to an embodiment of the present disclosure.

As illustrated in FIG. 7, the method includes: S702. The object detecting model is trained with a first training sample set, wherein the first training sample set includes image training samples labeled with first label information and the first label information includes a bounding box for a face object, a bounding box for a preset body part object, and a bounding box for a hand object.

In a case of performing this step, an original image may be truth-value-labeled by manual labeling or machine-aided labeling. For example, after acquiring the original image, a bounding box for the face object, a bounding box for the hand object and a bounding box for the preset body part object (such as an elbow) involved in the original image may be labeled by an image labeling tool to acquire a plurality of image training samples. It should be noted that the image training samples may be encoded with one-hot encoding, which is not limited in the present disclosure.

After the first training sample set is determined, the object detecting model may be trained according to a preset loss function until the object detecting model converges.

S704. The instance segmenting model is trained with a second training sample set; wherein the second training sample set includes image training samples labeled with second label information and the second label information includes a bounding box for a body object.

In a case of constructing the above image training samples, the original images may be acquired first. After acquiring the original image, a labeling tool may be used to determine respective body objects involved in the original image. After determining the respective body objects, a labeling tool may be configured to respectively label a bounding box for each body object. In the case of labeling, pixels in different bounding box may be labeled with different pixel values. For example, the original image involves body object A, body object B, and body object C. In the case of labeling, pixels in a bounding box for the body object A may be labeled with a pixel value 1, pixels in a bounding box for the body object B may be labeled with a pixel value 2, and pixels in a bounding box for the body object C may be labeled with a pixel value 3. After the second training sample set has been determined, the instance segmenting model may be trained with a conventional model training method until the instance segmenting model converges.

S706: The object detecting model, the instance segmenting model, and the correlation predicting model may be jointly trained with a third training sample set, wherein the third training sample set includes image training samples labeled with third label information and the third label information includes a bounding box for the face object, a bounding box for the preset body part object, a bounding box for the hand object, a bounding box for the body object, and correlation label information between the face object and the preset body part object, correlation label information between the preset body part object and the hand object, and correlation label information between the hand object and the face object.

In the case of performing this step, the original image may be truth-value-labeled by manual labeling or machine-aided labeling. For example, after acquiring the original image, on one hand, an image labeling tool can be used to label the bounding box for the face object, the bounding box for the hand object, and the bounding box for the preset body part object (such as the elbows) involved in the original image. On the other hand, the image labeling tool may be used to determine respective body objects involved in the original image. After determining the respective body objects, the image labeling tool may be used to label a bounding box for each body object. And further, the image labeling tool may be used to arbitrarily combine the face objects and the preset body part objects involved in the original image, arbitrarily combine the face objects and the hand objects involved in the original image, and arbitrarily combine the preset body part objects and the hand objects involved in the original image, so as to acquire a plurality of combinations. And then, correlation result is labeled for the two objects of each combination. In some embodiments of the present disclosure, in a case that the two objects of a combination belong to one person, the two objects of the combination are labeled with 1, the two objects of the combination are labeled with 0.

After the third training sample set has been determined, a joint learning loss function may be determined based on respective loss functions of the object detecting model, the instance segmenting model, and the correlation predicting model. In some embodiments of the present disclosure, the joint learning loss function may be acquired by summating the respective loss functions of the object detecting model, the instance segmenting model, and the correlation predicting model. It should be noted that, in the present disclosure, hyperparameters such as regularization terms can further be added to the joint learning loss function. The type of hyperparameters to be added is not limited in the present disclosure.

After acquiring the joint training loss function, the object detecting model, the instance segmenting model, and the correlation predicting model may be jointly trained with the joint learning loss function and the third training sample set, until all of the object detecting model, the instance segmenting model and the correlation predicting model converge.

In a case of training the models, hyperparameters such as learning rate and the number of training cycles may be determined first. After the hyperparameters are determined, supervised training may be performed on each model with the image training samples labeled with true values.

In a process of supervised training, forward propagation may be performed to acquire respective calculation results output from the models. After acquiring the respective calculation results output from the models, an error of the calculation result, that is, difference between the calculation result and the true value, may be evaluated based on the constructed joint learning loss function. After acquiring the error, a descent gradient may be determined through a stochastic gradient descent method. After determining the descent gradient, respective parameters of the models may be updated based on back propagation. Then, the above process may be repeated based on respective updated parameters of the models until the models converge. It should be noted that the condition for the models to converge may be such as reaching the preset number of training times, or the change of the joint learning loss function after successive M (M is a positive integer greater than 1) forward propagations is less than a preset threshold etc. The present disclosure does not limit the conditions for the models to converge.

Since a supervised joint training method is adopted for training the models, the models may be trained at the same time, so that trainings of the models may restrain each other and promote each other, thus, on one hand, converging efficiency of the models is improved, and on the other hand, the shared backbone network may extract features that are more beneficial to detect correlated objects, thereby improving the accuracy of detecting correlated objects.

At least one embodiment of the present disclosure further provides a device for detecting correlated objects involved in an image. Please refer to FIG. 8, which illustrates a structural diagram of a device for detecting correlated objects involved in an image according to an embodiment of the present disclosure.

Figure 8:
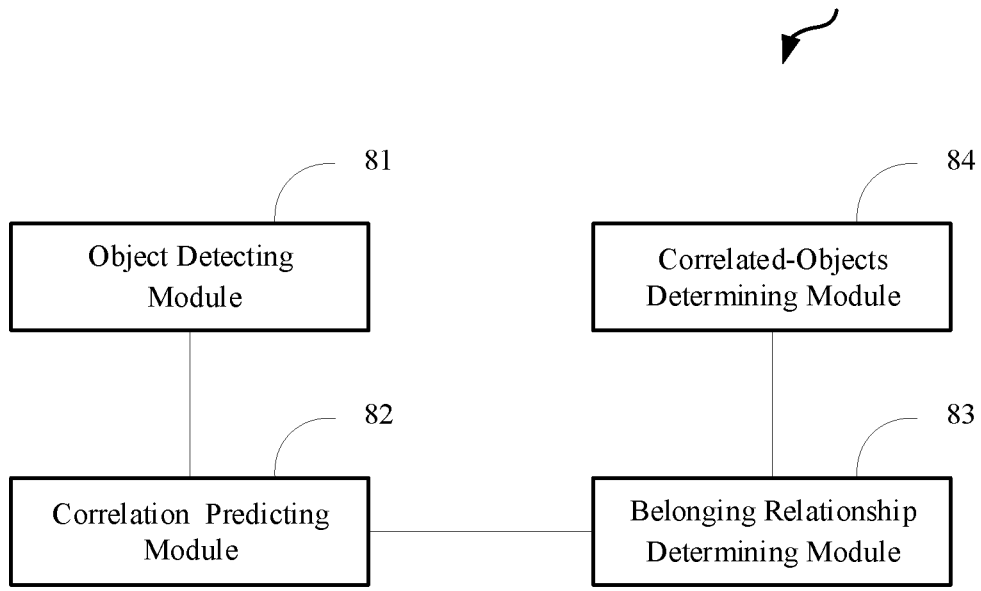
FIG. 8 illustrates a structural diagram of a device for detecting correlated objects involved in an image according to an embodiment of the present disclosure.

As illustrated in FIG. 8, a device 80 includes: an object detecting module 81, configured to detect a face object, a preset body part object and a hand object involved in the image; wherein the preset body part object indicates a preset body part of a body connection part between a face and a hand;

a correlation predicting module 82, configured to perform correlation prediction on every two objects among the face object, the preset body part object, and the hand object to acquire a first correlation prediction result between the face object and the preset body part object, a second correlation prediction result between the preset body part object and the hand object, and a third correlation prediction result of the face object and the hand object; and a belonging relationship determining module 83, configured to segment the image to determine at least one body object involved in the image, and determine a first body object to which the face object belongs and a second body object to which the preset body parts belongs based on a respective region corresponding to the at least one body object acquired by segmentation; and a correlated-objects determining module 84, configured to adjust the first correlation prediction result based on the first body object and the second body object, and determine correlated objects involved in the image according to the adjusted first correlation prediction result, the second correlation prediction result and the third correlation prediction result.

In some embodiments of the present disclosure, the object detecting module 81 is configured to detect a first bounding box for the face object and a second bounding box for the preset body part object involved in the image; and the belonging relationship determining module 83 includes: an overlapping area determining module, configured to determine a first overlapping area between a region corresponding to the face object and a respective region corresponding to the at least one body object according to the first bounding box for the face object and a second overlapping area between a region corresponding to the preset body part object and the respective region corresponding to the at least one body object according to the second bounding box for the preset body part object; and a belonging relationship determining sub-module, configured to determine a first body object to which the face object belongs and a second body object to which the preset body part object belongs according to the first overlapping area and the second overlapping area.

In some embodiments of the present disclosure, the belonging relationship determining sub-module is configured to: select, from the respective region corresponding to the at least one body object, a first target region where the first overlapping area between the region corresponding to the face object and the first target region is greatest among overlapping areas between the region corresponding to face object and candidate regions from the particular region; select, from the respective region corresponding to the at least one body object, a second target region where the second overlapping area between the region corresponding to the preset body part object and the second target region is greatest among overlapping areas between the region corresponding to preset body part object and candidate regions from the particular region; and determine a body object corresponding to the first target region as the first body object to which the face object belongs and a body object corresponding to the second target region as the second body object to which the preset body part object belongs.

In some embodiments of the present disclosure, the correlated-objects determining module 84 is configured to: acquire a matching result by comparing the first body object with the second body object; and adjust the first correlation prediction result according to the matching result.

In some embodiments of the present disclosure, the correlated-objects determining module 84 is configured to: increase a correlation prediction score in the first correlation prediction result in response to determining the first body object matches the second body object; and/or, decrease the correlation prediction score in the first correlation prediction result in response to determining the first body object does not match the second body object.

In some embodiments of the present disclosure, the device 80 further includes: a combining module, configured to generate at least one triad by combining the detected face object, the detected preset body part object, and the detected hand object, wherein each triad includes one face object, one preset body part object and one hand object; the correlation predicting module 82 is configured to: perform a correlation prediction on every two objects of each triad; the correlated-objects determining module 84 includes: a triad correlation relationship predicting module, configured to determine a fourth correlation prediction result of each triad according to the adjusted first correlation prediction result, the second correlation prediction result, and the third correlation prediction result; and a correlated-objects determining sub-module, configured to determine correlated objects involved in the image according to the fourth correlation prediction result of each triad.

In some embodiments of the present disclosure, the correlated-objects determining sub-module is configured to: select a current triad from respective triads according to an order of correlation prediction scores in the fourth correlation prediction results of the respective triads from high to low: determine, based on the determined correlated objects, whether the number of correlated hand objects that are correlated with the face object of the current triad reaches a first preset threshold and whether the number of correlated face objects that are correlated with the hand object of the current triad reaches a second preset threshold; and determine the face object and the hand object of the current triad as correlated objects involved in the image in response to determining the number of the correlated hand objects does not reach the first preset threshold and the number of the correlated face objects does not reach the second preset threshold.

In some embodiments of the present disclosure, the preset body part object includes at least one of a shoulder object or an elbow object.

In some embodiments of the present disclosure, the device 80 further includes an output module, configured to output a detection result of the correlated objects involved in the image.

In some embodiments of the present disclosure, the object detecting module 81 is configured to detect the face object, the preset body part object and the hand object involved in the image through the an object detecting model built based on a neural network; the correlation predicting module 82 is configured to perform a correlation prediction on every two of the face object, the preset body part object, and the hand object with an instance segmenting model built based on a neural network; and the belonging relationship determining module 83 is configured to segment the image to determine at least one body object involved in the image with an instance segmenting model built based on a neural network.

In some embodiments of the present disclosure, the device 80 further includes: a first training module, configured to train the object detecting model with a first training sample set, wherein the first training sample set includes image training samples labeled with first label information and the first label information includes a bounding box for the face object, a bounding box for the preset body part object and a bounding box for the hand object; a second training module, configured to train the instance segmenting model with a second training sample set, wherein the second training sample set includes image training samples labeled with second label information and the second label information includes bounding boxes for the body objects; and a joint training module, configured to jointly train the object detecting model, the instance segmenting model, and the correlation predicting model with a third training sample set, wherein the third training sample set includes image training samples labeled with third label information and the third label information includes the bounding box for the face object, the bounding box for the preset body part object, the bounding box for the hand object and the respective bounding box for the at least one body object, the correlation label information between the face object, the preset body part object and the hand object.

The device for detecting correlated objects involved in an image according to embodiments of the present disclosure may be applied to an electronic apparatus. Correspondingly, the present disclosure provides an electronic apparatus, which may include a processor; and memory, configured to store processor executable instructions; wherein the processor is configured to call the processor executable instructions stored in the memory to implement operations of the method of detecting correlated objects involved in an image according to any of the embodiments of the present disclosure.

Figure 9:
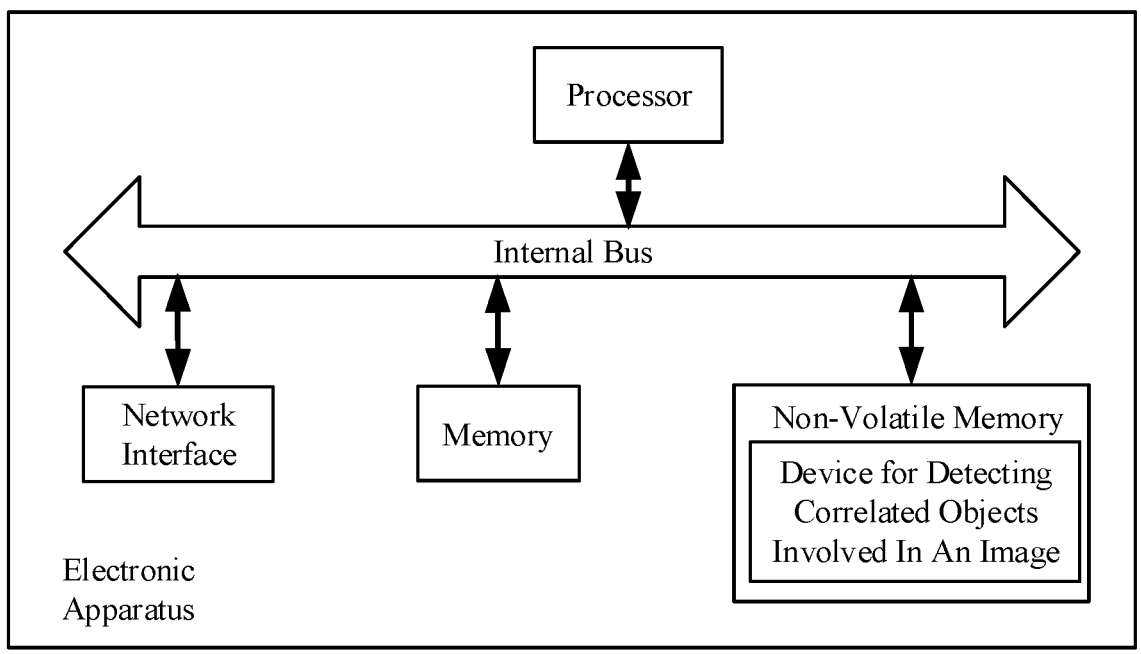
FIG. 9 illustrates a hardware structure diagram of an electronic apparatus according to an embodiment of the present disclosure.

Please refer to FIG. 9, which illustrates a hardware structure diagram of an electronic apparatus according to an embodiment of the present disclosure. As illustrated in FIG. 9, the electronic apparatus may include a processor configured to execute instructions, a network interface for network connection, memory configured to store operation data for the processor, and a non-volatile memory configured to store instructions for an image processing device. The image processing device may be implemented by software, hardware or a combination of software and hardware. Taking that the image processing device is implemented by software as an example, as a device in logical sense, the image processing device is formed by reading corresponding computer program instructions stored in the non-volatile memory into the memory through the processor of an electronic apparatus where it is located. From a perspective of hardware, in addition to the processor, the memory, the network interface, and the non-volatile memory illustrated in FIG. 9, the electronic apparatus where the device is located in the embodiment further includes other hardware according to actual functions of the electronic device, which will not be elaborated herein. It should be understood that, in order to increase processing speed, the corresponding instructions of the image processing device may further be directly stored in the memory, which is not limited herein.

The present disclosure provides a computer-readable storage medium which stores a computer program, and the computer program is configured to implement the method of detecting correlated objects involved in an image according to any one of the embodiments of the present disclosure.

The present disclosure provides a computer program, including computer-readable codes which, when executed in an electronic device, cause a processor in the electronic device to perform the method of detecting correlated objects involved in an image according to any embodiment as described above.

Those skilled in the art should understand that one or more embodiments of the present disclosure may be provided as a method, a system, or a computer program product. Therefore, one or more embodiments of the present disclosure may be implemented completely in a form of software, hardware, or a combination of software and hardware. Moreover, one or more embodiments of the present disclosure may be implemented in a form of computer program product implemented on a computer readable storage medium (including, but not limited to, a disk storage, CD-ROM, optical storage, etc.) containing computer executable program code.

In the present disclosure, the term "and/or" means having at least one of two. For example, "A and/or B" may include three schemes: A alone, B alone, and both A and B.

The embodiments in the present disclosure are described in a progressive manner, and the same or similar parts between the various embodiments can be referred to each other, and each embodiment focuses on the differences from others. In particular, as for the data processing device embodiment, since it is substantially similar to the method embodiment, description thereof is made relatively simple, and as to related portions, please refer to the description of the method embodiment.

The foregoing describes some embodiments of the present disclosure. Other embodiments fall within the protection scope defined by the appended claims. In some cases, the actions or steps described in the claims may be performed in a different order from that in the embodiments and desired results may also be achieved. In addition, the processes depicted in the drawings are not necessarily required to be performed in the specific order or sequential order as illustrated to achieve the desired result. In some embodiments, multitasking and parallel processing are also possible or may be advantageous.

The embodiments of the subject matter and functional operations described in the present disclosure may be implemented in the following: digital electronic circuits, tangible computer software or firmware, computer hardware that can include the structures disclosed in the present disclosure and their structural equivalents, or one or more combination thereof. The embodiments of the subject matter described in the present disclosure may be implemented as one or more computer programs, that is, one or more modules of the computer program instructions coded on a tangible non-transitory program carrier to be executed by a data processing device or to control the operation of the data processing device. Alternatively or in addition, the program instructions may be encoded on artificially generated propagated signals, such as machine-generated electrical, optical or electromagnetic signals, which are generated to encode information and transmit it to a suitable receiver device, so as to be executed by a data processing device. The computer readable storage medium may be a machine-readable storage device, a machine-readable storage medium, a random or serial access memory device, or one or more combination thereof.

The processing and the logic flow described in the present disclosure may be executed by one or more programmable computers executing one or more computer programs to perform corresponding functions by performing operations on input data and generating output. The above processing and the logic flow can also be executed by a dedicated logic circuit, such as FPGA (Field Programmable Gate Array) or ASIC (Application Specific Integrated Circuit), and the device may further be implemented as a dedicated logic circuit.

A computer suitable for executing computer programs may include, for example, general-purpose and/or special-purpose microprocessors, or any other type of central processing unit. Typically, the central processing unit receives instructions and data from read-only memory and/or random-access memory. The basic components of a computer may include a central processing unit for implementing or executing instructions and one or more memory devices for storing instructions and data. Typically, the computer further includes one or more mass storage devices for storing data, such as magnetic disks, magneto-optical disks, or optical disks, etc., or the computer may be operatively coupled to the mass storage device to receive/send data from/to it, or both. However, it is not necessary for the computer to have such equipment. In addition, the computer may be embedded in another device, such as a mobile phone, a personal digital assistant (PDA), a mobile audio or video player, a game console, a global positioning system (GPS) receiver, or a universal serial bus (USB) Flash drives based on portable storage devices, which are taken as examples.

Computer-readable media suitable for storing computer program instructions and data may include non-volatile memory, media, and memory devices of all forms, such as semiconductor memory devices (such as EPROM, EEPROM, and flash memory devices), and magnetic disks (such as internal hard disks, or removable disks), magneto-optical disks, CD ROM and DVD-ROM. The processor and the memory may be implemented by or incorporated into a dedicated logic circuit.

Although the present disclosure contains many implementation details, these are only used to describe features of the disclosed embodiments and should not be construed as a limit to the disclosed scope or the claimed scope. Certain features described in various embodiments of the present disclosure can further be implemented in combination in a single embodiment. On the other hand, various features described in a single embodiment can further be implemented separately or in any suitable sub-combination in various embodiments. In addition, although features can function in certain combinations as described above and even as originally claimed, one or more features from the claimed combination can be removed from the combination in some cases, and the claimed combination may refer to a sub-combination or a variant of the sub-combination.

Similarly, although the operations are depicted in a specific order in the drawings, this should not be construed as that the operations are required to be performed in the illustrated requiring these operations to be performed in the specific order as illustrated or sequentially, or all illustrated operations are required to be performed to achieve the desired result. In some cases, multitasking and parallel processing may be advantageous. In addition, separation of various modules and components of the system in the embodiments should not be understood as that such separation is required in all embodiments, and it should be understood that the described program components and systems may usually be integrated together in a single software product, or may be packaged into a plurality of software products.

Thus, specific embodiments of the subject matter have been described. Other embodiments are within the scope defined by the appended claims. In some cases, the actions recited in the claims can be performed in a different order and desired results are also achieved. In addition, the processes depicted in the drawings are not necessarily in the specific order or sequential order as illustrated in order to achieve the desired result. In some implementations, multitasking and parallel processing may be advantageous.

The above are only some embodiments of the present disclosure, and are not intended to limit the disclosure to specific embodiments. All modification, equivalent replacement, improvement, etc., without departing the spirit and the principle of the present disclosure, fall into the protection scope as defined in the appended claims.

The invention claimed is:

1. A method of detecting correlated objects involved in an image, the method comprising:
   detecting a face object, a preset body part object, and a hand object involved in the image, wherein the preset body part object indicates a preset body part of a body connection part between a face and a hand;
   performing a respective correlation prediction on every two of the face object, the preset body part object, and the hand object to acquire:
      a first correlation prediction result between the face object and the preset body part object,
      a second correlation prediction result between the preset body part object and the hand object, and
      a third correlation prediction result between the face object and the hand object;
   segmenting the image to determine at least one body object involved in the image;
   determining, based on a particular region corresponding to the at least one body object, a first body object to which the face object belongs and a second body object to which the preset body part object belongs;
   adjusting the first correlation prediction result based on the first body object and the second body object; and
   determining correlated objects involved in the image according to the adjusted first correlation prediction result, the second correlation prediction result and the third correlation prediction result.

2. The method according to claim 1, wherein detecting the face object, the preset body part object and the hand object involved in the image comprises:
   detecting a first bounding box for the face object and a second bounding box for the preset body part object involved in the image, and
   wherein determining based on the particular region corresponding to the at least one body object, the first body object to which the face object belongs and the second body object to which the preset body part object belongs comprises:
   determining a first overlapping area between a region corresponding to the face object and the particular region corresponding to the at least one body object according to the first bounding box for the face object;
   determining a second overlapping area between a region corresponding to the preset body part object and the particular region corresponding to the at least one body object according to the second bounding box for the preset body part object; and
   determining the first body object to which the face object belongs and the second body object to which the preset body part object belongs according to the first overlapping area and the second overlapping area.

3. The method according to claim 2, wherein determining the first body object to which the face object belongs and the second body object to which the preset body part object belongs according to the first overlapping area and the second overlapping area comprises:
   selecting, from the particular region corresponding to the at least one body object, a first target region, wherein the first overlapping area between the region corresponding to the face object and the first target region is greatest among overlapping areas between the region corresponding to face object and candidate regions from the particular region;
   selecting, from the particular region corresponding to the at least one body object, a second target region, wherein the second overlapping area between the region corresponding to the preset body part object and the second target region is greatest among overlapping areas between the region corresponding to preset body part object and candidate regions from the particular region;
   determining a body object corresponding to the first target region as the first body object to which the face object belongs; and
   determining a body object corresponding to the second target region as the second body object to which the preset body part object belongs.

4. The method according to claim 1, wherein adjusting the first correlation prediction result based on the first body object and the second body object comprises:
   acquiring a matching result by comparing the first body object with the second body object; and
   adjusting the first correlation prediction result based on the matching result.

5. The method according to claim 4, wherein adjusting the first correlation prediction result based on the matching result comprises one of:
   in response to determining the first body object matches the second body object, increasing a correlation prediction score in the first correlation prediction result; or
   in response to determining that the first body object does not match the second body object, decreasing the correlation prediction score in the first correlation prediction result.

6. The method according to claim 1, further comprising:
   combining the face object, the preset body part object, and the hand object to generate one or more triads, each of the one or more triads comprising one face object, one body part object, and one hand object, wherein performing the respective correlation prediction on every two of the face object, the preset body part object, and the hand object comprises:
 performing a respective correlation prediction on every two objects of each of the one or more triads, and
wherein determining the correlated objects involved in the image according to the adjusted first correlation prediction result, the second correlation prediction result, and the third correlation prediction result comprises:
 determining a fourth correlation prediction result of each of the one or more triads according to the adjusted first correlation prediction result, the second correlation prediction result, and the third correlation prediction result; and
 determining the correlated objects involved in the image based on the fourth correlation prediction result of each of the one or more triads.

7. The method according to claim 6, wherein determining the correlated objects involved in the image based on the fourth correlation prediction result of each of the one or more triads comprises:
 selecting a current triad from the one or more triads according to an order of correlation prediction scores in the fourth correlation prediction results of the one or more triads from high to low; and
 for the current triad,
  determining, based on the determined correlated objects, whether a number of correlated hand objects that are correlated with the face object of the current triad reaches a first preset threshold and whether a number of correlated face objects that are correlated with the hand object of the current triad reaches a second preset threshold; and
  determining the face object and the hand object of the current triad as the correlated objects involved in the image in response to determining that the number of the correlated hand objects does not reach the first preset threshold and the number of the correlated face objects does not reach the second preset threshold.

8. The method according to claim 1, wherein the preset body part object comprises at least one of a shoulder object or an elbow object.

9. The method according to claim 1, further comprises:
 outputting a detection result of the correlated objects involved in the image.

10. The method according to claim 1, wherein detecting the face object, the preset body part object, and the hand object involved in the image comprises:
 detecting the face object, the preset body part object, and the hand object involved in the image with an object detecting model built based on a neural network,
 wherein performing the respective correlation prediction on every two of the face object, the preset body part object, and the hand object comprises:
 performing the respective correlation prediction on every two of the face object, the preset body part object, and the hand object with a correlation predicting model built based on a neural network, and
 wherein segmenting the image to determine the at least one body object involved in the image comprises:
 segmenting the image to determine the at least one body object involved in the image with an instance segmenting model built based on a neural network.

11. The method according to claim 10, further comprising:
 training the object detecting model with a first training sample set, wherein the first training sample set comprises image training samples labeled with first label information and the first label information comprises a bounding box for the face object, a bounding box for the preset body part object, and a bounding box for the hand object;
 training the instance segmenting model with a second training sample set, wherein the second training sample set comprises image training samples labeled with second label information and the second label information comprises a bounding box for the body object; and
 jointly training the object detecting model, the instance segmenting model, and the correlation predicting model with a third training sample set, wherein the third training sample set comprises image training samples labeled with third label information and the third label information comprises a bounding box for the face object, a bounding box for the preset body part object, a bounding box for the hand object, a bounding box for the body object, correlation label information between the face object and the preset body part object, correlation label information between the preset body part object and the hand object, and correlation label information between the hand object and the face object.

12. An electronic apparatus, comprising:
at least one processor; and
one or more memories coupled to the at least one processor and storing programming instructions for execution by the at least one processor to perform operations for detecting correlated objects involved in an image, the operations comprising:
 detecting a face object, a preset body part object, and a hand object involved in the image, wherein the preset body part object indicates a preset body part of a body connection part between a face and a hand;
 performing a respective correlation prediction on every two of the face object, the preset body part object, and the hand object to acquire:
  a first correlation prediction result between the face object and the preset body part object,
  a second correlation prediction result between the preset body part object and the hand object, and
  a third correlation prediction result between the face object and the hand object;
 segmenting the image to determine at least one body object involved in the image;
 determining, based on a particular region corresponding to the at least one body object, a first body object to which the face object belongs and a second body object to which the preset body part object belongs;
 adjusting the first correlation prediction result based on the first body object and the second body object; and
 determining correlated objects involved in the image according to the adjusted first correlation prediction result, the second correlation prediction result and the third correlation prediction result.

13. The electronic apparatus according to claim 12, wherein detecting the face object, the preset body part object and the hand object involved in the image comprises:
 detecting a first bounding box for the face object and a second bounding box for the preset body part object involved in the image, and
 wherein determining based on the particular region corresponding to the at least one body object, the first body object to which the face object belongs and the second body object to which the preset body part object belongs comprises:
  determining a first overlapping area between a region corresponding to the face object and the particular region corresponding to the at least one body object according to the first bounding box for the face object;
  determining a second overlapping area between a region corresponding to the preset body part object and the particular region corresponding to the at least one body object according to the second bounding box for the preset body part object; and
  determining the first body object to which the face object belongs and the second body object to which the preset body part object belongs according to the first overlapping area and the second overlapping area.

14. The electronic apparatus according to claim 13, wherein determining the first body object to which the face object belongs and the second body object to which the preset body part object belongs according to the first overlapping area and the second overlapping area comprises:
  selecting, from the particular region corresponding to the at least one body object, a first target region, wherein the first overlapping area between the region corresponding to the face object and the first target region is greatest among overlapping areas between the region corresponding to face object and candidate regions from the particular region;
  selecting, from the particular region corresponding to the at least one body object, a second target region, wherein the second overlapping area between the region corresponding to the preset body part object and the second target region is greatest among overlapping areas between the region corresponding to preset body part object and candidate regions from the particular region;
  determining a body object corresponding to the first target region as the first body object to which the face object belongs; and
determining a body object corresponding to the second target region as the second body object to which the preset body part object belongs.

15. The electronic apparatus according to claim 12, wherein adjusting the first correlation prediction result based on the first body object and the second body object comprises:
  acquiring a matching result by comparing the first body object with the second body object; and
  adjusting the first correlation prediction result based on the matching result.

16. The electronic apparatus according to claim 15, wherein adjusting the first correlation prediction result based on the matching result comprises one of:
  in response to determining the first body object matches the second body object, increasing a correlation prediction score in the first correlation prediction result; or
  in response to determining that the first body object does not match the second body object, decreasing the correlation prediction score in the first correlation prediction result.

17. The electronic apparatus according to claim 12, wherein the operations further comprise:
  combining the face object, the preset body part object, and the hand object to generate one or more triads, each of the one or more triads comprising one face object, one body part object, and one hand object,
wherein performing the respective correlation prediction on every two of the face object, the preset body part object, and the hand object comprises:
  performing a respective correlation prediction on every two objects of each of the one or more triads, and
  wherein determining the correlated objects involved in the image according to the adjusted first correlation prediction result, the second correlation prediction result, and the third correlation prediction result comprises:
  determining a fourth correlation prediction result of each of the one or more triads according to the adjusted first correlation prediction result, the second correlation prediction result, and the third correlation prediction result; and
  determining the correlated objects involved in the image based on the fourth correlation prediction result of each of the one or more triads.

18. The electronic apparatus according to claim 17, wherein determining the correlated objects involved in the image based on the fourth correlation prediction result of each of the one or more triads comprises:
  selecting a current triad from the one or more triads according to an order of correlation prediction scores in the fourth correlation prediction results of the one or more triads from high to low; and
  for the current triad,
    determining, based on the determined correlated objects, whether a number of correlated hand objects that are correlated with the face object of the current triad reaches a first preset threshold and whether a number of correlated face objects that are correlated with the hand object of the current triad reaches a second preset threshold; and
    determining the face object and the hand object of the current triad as the correlated objects involved in the image in response to determining that the number of the correlated hand objects does not reach the first preset threshold and the number of the correlated face objects does not reach the second preset threshold.

19. The electronic apparatus according to claim 12, wherein the preset body part object comprises at least one of a shoulder object or an elbow object.

20. A non-transitory computer-readable storage medium coupled to the at least one processor and storing programming instructions for execution by the at least one processor, wherein the programming instructions instruct the at least one processor to perform operations for detecting correlated objects involved in an image, the operations comprising:
  detecting a face object, a preset body part object, and a hand object involved in the image, wherein the preset body part object indicates a preset body part of a body connection part between a face and a hand;
  performing a respective correlation prediction on every two of the face object, the preset body part object, and the hand object to acquire:
    a first correlation prediction result between the face object and the preset body part object,
    a second correlation prediction result between the preset body part object and the hand object, and
    a third correlation prediction result between the face object and the hand object;
  segmenting the image to determine at least one body object involved in the image;
  determining, based on a particular region corresponding to the at least one body object, a first body object to which the face object belongs and a second body object to which the preset body part object belongs;

adjusting the first correlation prediction result based on the first body object and the second body object; and determining correlated objects involved in the image according to the adjusted first correlation prediction result, the second correlation prediction result and the third correlation prediction result.

\* \* \* \* \*